(12) United States Patent
Sibbach et al.

(10) Patent No.: US 12,545,414 B2
(45) Date of Patent: *Feb. 10, 2026

(54) REVERSE FLOW GAS TURBINE ENGINE HAVING ELECTRIC MACHINE

(71) Applicants: General Electric Company, Evendale, OH (US); General Electric Company Polska Sp. z o.o., Warsaw (PL)

(72) Inventors: Arthur William Sibbach, Boxford, MA (US); Adam Tomasz Pazinski, Warsaw (PL)

(73) Assignees: General Electric Company, Evendale, OH (US); General Electric Company Polska Sp. z o.o., Warsaw (PL)

( * ) Notice: Subject to any disclaimer, the term of this patent is extended or adjusted under 35 U.S.C. 154(b) by 0 days.

This patent is subject to a terminal disclaimer.

(21) Appl. No.: 19/210,629

(22) Filed: May 16, 2025

(65) Prior Publication Data

US 2025/0276797 A1    Sep. 4, 2025

Related U.S. Application Data

(63) Continuation of application No. 18/990,417, filed on Dec. 20, 2024, now Pat. No. 12,319,417, which is a
(Continued)

(30) Foreign Application Priority Data

Feb. 17, 2023   (PL) .......................................... 443814

(51) Int. Cl.
*B64D 27/33*   (2024.01)
*B64D 27/10*   (2006.01)
(Continued)

(52) U.S. Cl.
CPC ............. *B64D 27/33* (2024.01); *B64D 27/10* (2013.01); *F01D 11/003* (2013.01); *F02C 3/145* (2013.01);
(Continued)

(58) Field of Classification Search
CPC ......... B64D 27/10; B64D 27/33; F02C 3/145; F02C 7/12; F02C 7/16; F02C 7/18;
(Continued)

(56) References Cited

U.S. PATENT DOCUMENTS

| 3,930,748 A | 1/1976 | Redman et al. |
| 4,168,938 A | 9/1979 | Dodd |

(Continued)

FOREIGN PATENT DOCUMENTS

| EP | 2708701 A2 | 3/2014 |
| EP | 3792465 A1 | 3/2021 |

(Continued)

OTHER PUBLICATIONS

European Patent Office, "Extended European Search Report," issued in connection with European Patent Application No. 24151475.1, dated Jun. 14, 2024, 7 pages.

*Primary Examiner* — Loren C Edwards
(74) *Attorney, Agent, or Firm* — Hanley, Flight & Zimmerman, LLC

(57) ABSTRACT

An aircraft engine assembly includes a gas turbine engine having an intake channel configured to receive an incoming flow of air and form an intake flow of air, the intake channel configured to turn the received incoming flow of air from an incoming flow direction to a first axial direction of the gas turbine engine, the incoming flow direction reverse of the first axial direction, and an electric machine coupled with the low pressure shaft and located at the aft end of the gas turbine engine proximate the intake channel, the electric
(Continued)

machine in heat exchange communication with the intake flow of air such that the electric machine transfers heat to the incoming flow of air within the intake channel when the electric machine is operated.

20 Claims, 19 Drawing Sheets

Related U.S. Application Data continuation-in-part of application No. 18/307,938, filed on Apr. 27, 2023, now Pat. No. 12,188,414.

(51) Int. Cl.
| | | |
|---|---|---|
| *F01D 11/00* | (2006.01) | |
| *F02C 3/14* | (2006.01) | |
| *F02C 7/18* | (2006.01) | |
| *F02C 7/28* | (2006.01) | |
| *F02C 7/32* | (2006.01) | |

(52) U.S. Cl.
CPC ............... *F02C 7/18* (2013.01); *F02C 7/28* (2013.01); *F02C 7/32* (2013.01); *F05D 2220/76* (2013.01); *F05D 2240/55* (2013.01)

(58) Field of Classification Search
CPC ...... F02C 7/20; F02C 7/28; F02C 7/32; F01D 5/147; F01D 5/16; F01D 5/18; F01D 5/188; F01D 5/26; F01D 11/00; F01D 11/003; F01D 11/025; F01D 11/005; F01D 11/006; F01D 15/10; F01D 25/04; F01D 25/06; F01D 25/12; F01D 25/14; F01D 25/164; F01D 25/26; F01D 25/28; F01D 25/285; F05D 2220/32; F05D 2220/323; F05D 2220/76; F05D 2260/20; F05D 2260/213; F05D 2260/232; F05D 2260/941; F05D 2260/96; F05D 2240/126; F05D 2240/14; F05D 2240/55; F02K 3/06; F02K 1/04
See application file for complete search history.

(56) References Cited

U.S. PATENT DOCUMENTS

| | | |
|---|---|---|
| 5,265,408 A | 11/1993 | Sheoran et al. |
| 7,360,769 B2 | 4/2008 | Bennett |
| 7,372,175 B2 | 5/2008 | Bouiller et al. |
| 8,016,549 B2 | 9/2011 | Shah et al. |
| 8,176,725 B2 | 5/2012 | Norris et al. |
| 8,278,774 B2 | 10/2012 | Macchia |
| 8,926,262 B2 | 1/2015 | Tanahashi et al. |
| 9,097,134 B2 | 8/2015 | Ferch et al. |
| 9,169,780 B2 | 10/2015 | Barnett et al. |
| 9,239,029 B2 | 1/2016 | Herrmann |
| 9,341,072 B2 | 5/2016 | Hanumanthan et al. |
| 9,556,750 B2 | 1/2017 | Freeman et al. |
| 9,810,096 B2 | 11/2017 | Evans et al. |
| 9,915,164 B2 | 3/2018 | Roberge |
| 9,920,429 B2 | 3/2018 | Carlsten et al. |
| 10,077,041 B1 | 9/2018 | Wicks |
| 10,174,636 B2 | 1/2019 | Zierer et al. |
| 10,240,470 B2 | 3/2019 | Hagan et al. |
| 10,260,363 B2 | 4/2019 | Snider et al. |
| 10,294,802 B2 | 5/2019 | Shi et al. |
| 10,308,366 B2 | 6/2019 | Kupiszewski et al. |
| 10,458,340 B2 | 10/2019 | Lefebvre |
| 10,550,764 B2 | 2/2020 | Roberge |
| 10,788,211 B2 | 9/2020 | Pettersson et al. |
| 10,914,185 B2 | 2/2021 | Bonacum et al. |
| 11,162,379 B2 | 11/2021 | Spierling |
| 11,203,981 B1 | 12/2021 | Propheter-Hinckley et al. |
| 11,242,156 B2 | 2/2022 | Spierling |
| 11,371,430 B2 | 6/2022 | Lents et al. |
| 11,499,443 B2 | 11/2022 | Quach et al. |
| 2010/0313419 A1 | 12/2010 | Stampfli et al. |
| 2011/0081235 A1 | 4/2011 | Shah et al. |
| 2012/0186269 A1 | 7/2012 | Cihlar et al. |
| 2013/0091850 A1 | 4/2013 | Francisco |
| 2013/0145769 A1 | 6/2013 | Norris et al. |
| 2013/0183136 A1 | 7/2013 | Roberge et al. |
| 2013/0255224 A1 | 10/2013 | Kupratis et al. |
| 2014/0079530 A1 | 3/2014 | Ferch et al. |
| 2016/0023272 A1 | 1/2016 | Mongillo, Jr. et al. |
| 2016/0169026 A1 | 6/2016 | Jones |
| 2016/0177761 A1 | 6/2016 | Huizenga et al. |
| 2016/0194978 A1 | 7/2016 | Memmen |
| 2016/0290226 A1 | 10/2016 | Roberge |
| 2018/0003071 A1 | 1/2018 | Lents et al. |
| 2018/0003072 A1 | 1/2018 | Lents et al. |
| 2018/0003109 A1 | 1/2018 | Lents et al. |
| 2018/0023470 A1 | 1/2018 | Lefebvre |
| 2018/0073438 A1 | 3/2018 | Durocher et al. |
| 2019/0063324 A1 | 2/2019 | Gould et al. |
| 2019/0316486 A1 | 10/2019 | Roberge |
| 2020/0017225 A1 | 1/2020 | Chung et al. |
| 2020/0025025 A1 | 1/2020 | Sippel et al. |
| 2020/0080476 A1 | 3/2020 | Plante et al. |
| 2020/0080611 A1 | 3/2020 | Blank et al. |
| 2020/0173300 A1 | 6/2020 | Gemin |
| 2020/0291810 A1 | 9/2020 | Spierling |
| 2021/0231058 A1 | 7/2021 | Plante et al. |
| 2021/0239046 A1 | 8/2021 | Muldoon |
| 2021/0262386 A1 | 8/2021 | Makela et al. |
| 2021/0324799 A1 | 10/2021 | Suzuki et al. |
| 2021/0332756 A1 | 10/2021 | Sharma et al. |
| 2021/0355869 A1 | 11/2021 | Lefebvre |
| 2021/0388732 A1 | 12/2021 | Turcotte |
| 2022/0045573 A1 | 2/2022 | Seki et al. |
| 2022/0090507 A1 | 3/2022 | Erdmenger et al. |
| 2022/0307418 A1 | 9/2022 | Vitt et al. |
| 2022/0403782 A1 | 12/2022 | Menheere |
| 2023/0193784 A1* | 6/2023 | Sharma .................. F01D 9/042 415/108 |
| 2023/0243310 A1 | 8/2023 | Plante et al. |
| 2025/0121945 A1* | 4/2025 | Sibbach .................. F02C 7/32 |

FOREIGN PATENT DOCUMENTS

| | | |
|---|---|---|
| EP | 3808430 B1 | 8/2023 |
| FR | 2981406 A1 | 4/2013 |
| GB | 2610568 A | 3/2023 |

* cited by examiner

REVERSE FLOW GAS TURBINE ENGINE HAVING ELECTRIC MACHINE

PRIORITY INFORMATION

The present application claims priority to U.S. patent application Ser. No. 18/990,417, filed on Dec. 20, 2024, which is a Continuation in-part of U.S. patent application Ser. No. 18/307,938, filed on Apr. 27, 2023, which claims priority to Polish Patent Application Number P.443814, filed on Feb. 17, 2023. U.S. patent application Ser. No. 18/990, 417, U.S. patent application Ser. No. 18/307,938 and Polish Patent Application Number P.443814 are hereby incorporated by reference in their entirety for all purposes.

FIELD

The present disclosure relates generally to a reverse flow gas turbine engine having an electric machine.

BACKGROUND

A gas turbine engine generally includes a turbomachine and a rotor assembly. Gas turbine engines, such as turboprop engines, may be used for aircraft propulsion. In the case of a turboprop engine, the rotor assembly may be configured as a variable pitch propeller. In some installations the gas turbine engine is oriented in a reverse flow configuration such that an air flow provided by forward motion of an aircraft is received by the gas turbine engine and turned to flow in a reverse direction through the turbomachinery of the gas turbine engine before an exhaust is discharged from the engine. Locating auxiliary components in such a reverse flow configuration remains an area of interest.

BRIEF DESCRIPTION OF THE DRAWINGS

A full and enabling disclosure of the presently described technology, including the best mode thereof, directed to one of ordinary skill in the art, is set forth in the specification, which makes reference to the appended figures, in which.

DETAILED DESCRIPTION

Figure 1:
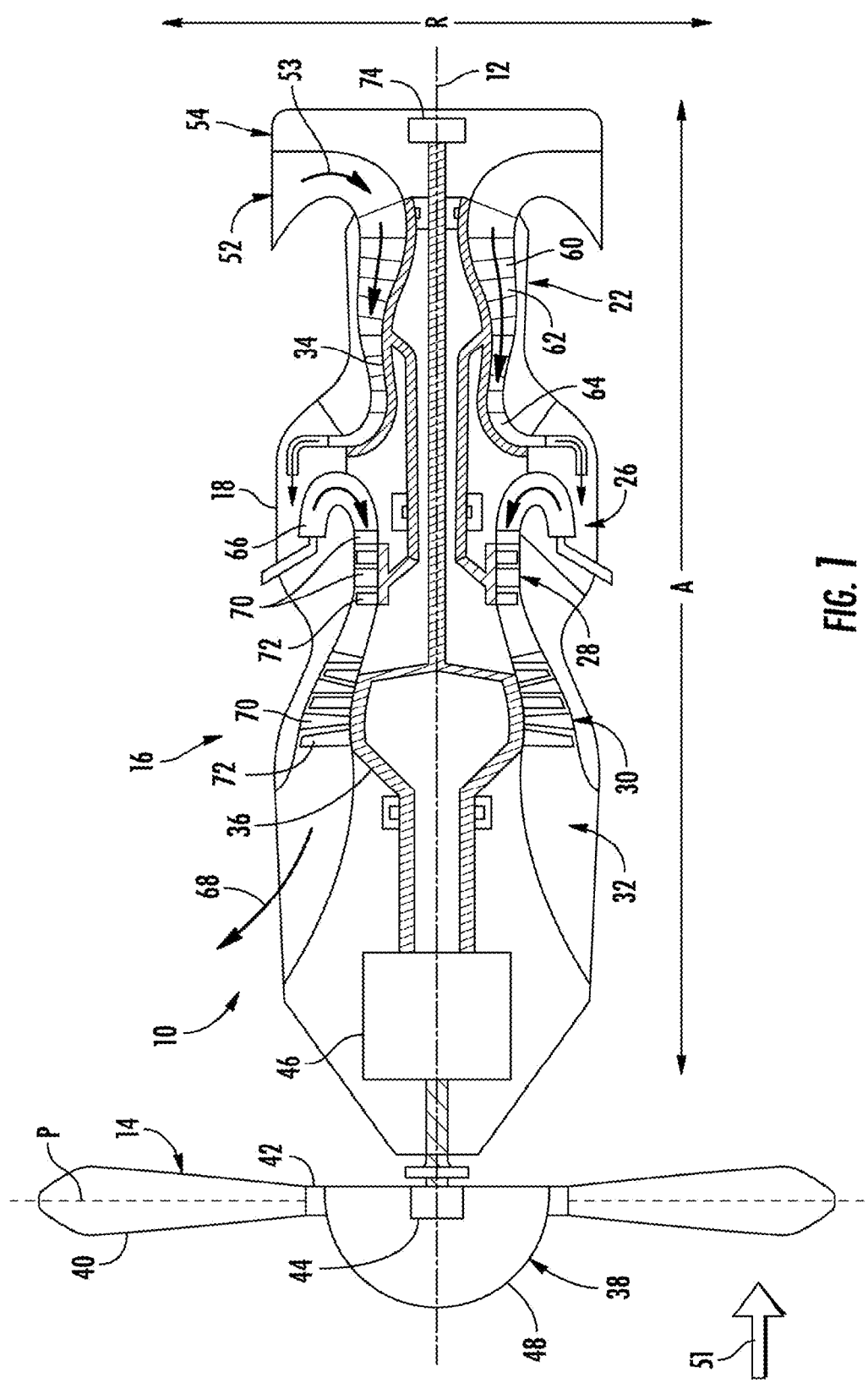
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "gas turbine engine" refers to an engine having a turbomachine as all or a portion of its power source.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative pressure within an engine unless otherwise specified. For example, a "low turbine" or "low pressure turbine" defines a component configured to operate at a pressure lower than a "high pressure turbine" of the engine.

The terms "forward" and "aft" refer to relative positions within a gas turbine engine or vehicle, and refer to the normal operational attitude of a vehicle such as an aircraft. For example, with regard to an aircraft, forward refers to a position closer to a nose of the aircraft and aft refers to a position closer to an empennage of the aircraft.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

As used herein, the terms "system," "unit," "module,", "engine,", "component," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, or system may include a hard-wires device that performs operations based on hard-wired logic of the device. Various modules, units, engines, and/or systems shown in the attached figures may represent the hardware that operates based on software or hardwired instructions, the software that directs hardware to perform the operations, or a combination thereof.

As will be discussed in more detail below, the subject matter of the present disclosure is directed generally to locating an electric machine near an intake channel of a reverse flow turboprop engine at a location which is closer to an aft end of the turboprop engine than to a forward end of the turboprop engine. The electric machine is rotatingly coupled to a low pressure shaft of the reverse flow turboprop engine and as a consequence of the reverse flow configuration the low pressure shaft extends aft of a core of the turboprop engine. The electric machine can be operated as a generator and/or motor for use in either adding power to and/or extracting power from the low pressure shaft. Placement of the electric machine in the proximate location described above permits an exchange of heat between the electric machine and a flow of air traversing through an intake channel of the engine. Such exchange of heat can provide tighter packaging of the electric machine and/or higher heat generating operating demands placed upon the electric machine.

To accommodate the placement of the electric machine in an aft location in at least one embodiment, an intake channel may be provided that forms a non-annular flow path at an inlet to the intake channel which then changes to an annular flow path around the LP shaft prior to air being delivered to a compressor of the gas turbine engine.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a reverse flow turboprop engine 10, referred to herein as "turboprop engine 10." As shown in FIG. 1, turboprop engine 10 defines an axial direction A (extending parallel to a longitudinal centerline or central axis 12 provided for reference), a radial direction R, and a circumferential direction C (not shown) disposed about the axial direction A. Turboprop engine 10 generally includes a propeller section 14 and a core turbine engine 16 disposed aft of the propeller section 14 from an aircraft perspective, the propeller section 14 being operable with, and driven by, core turbine engine 16.

The exemplary core turbine engine 16 depicted generally includes a substantially tubular outer casing 18 extending generally along axial direction A. Outer casing 18 generally encloses core turbine engine 16 and may be formed from a single casing or multiple casings. Core turbine engine 16 includes, in a serial flow relationship, a compressor 22, a combustion section 26, a high pressure (HP) turbine 28, a low pressure (LP) turbine 30, and an exhaust section 32. An air flow path generally extends through compressor 22, combustion section 26, HP turbine 28, LP turbine 30, and exhaust section 32 which are in fluid communication with each other.

An HP shaft or spool 34 drivingly connects the HP turbine 28 to the compressor 22. An LP shaft or spool 36 drivingly connects the LP turbine 30 to propeller section 14 of the turboprop engine 10. For the embodiment depicted, propeller section 14 includes a variable pitch propeller 38 having a plurality of propeller blades 40 coupled to a disk 42 in a spaced apart manner. As depicted, the propeller blades 40 extend outwardly from disk 42 generally along the radial direction R. Each propeller blade 40 is rotatable relative to the disk 42 about a pitch axis P by virtue of the propeller blades 40 being operatively coupled to a suitable actuation member 44 configured to collectively vary the pitch of the propeller blades 40 in unison. The propeller blades 40, disk 42, and actuation member 44 are together rotatable about the longitudinal centerline 12 by LP shaft 36 across a power gear box 46. The power gear box 46 includes a plurality of gears for stepping down the rotational speed of the LP shaft 36 to a more efficient rotational fan speed and is attached to one or both of a core frame or a fan frame through one or more coupling systems. Disk 42 is covered by a rotatable front bub 48 aerodynamically contoured to promote an airflow through the plurality of propeller blades 40.

During operation of the turboprop engine 10, a volume of air 50 (also referred to as a free stream flow of air 51 prior to its encounter with the propeller 38, and referred to as an incoming flow of air 50 after passage through the propeller 38) passes through blades 40 of propeller 38 and is urged toward a radial inlet 52 of core turbine engine 16. More specifically, turboprop engine 10 includes an intake channel 54 that defines radial inlet 52 that routes an inlet portion of air 53 of the flow of air 50 from inlet 52 downstream to compressor 22. Though the inlet 52 is depicted as a radial inlet in the embodiment of FIG. 1, other configurations of inlet 52 are also contemplated. For example, the inlet 52 can also take the form of an inlet arranged in an axial direction to capture the inlet portion of air 53 of the volume of air 50. The inlet portion of air 53 of the flow of air 50 captured by the inlet 52 is referred to herein as an intake flow of air. The intake channel 54 defines the intake flow of air and generally extends from an inlet of the intake channel 54 to just upstream of the compressor 22.

The turboprop engine 10 embodiments described herein are configured as reverse flow engines. Such engines are characterized by a general relationship between the direction of the flow of incoming air 50 (such direction can be used to characterize the relative motion of air during a mode of operation of the engine 10 such as a forward thrust mode) and that of the flow of air axially through the turboprop engine 10. The flow of air through the core turbine engine 16 is generally reverse to that of the flow of incoming air 50. Turning the flow from the direction of the incoming flow of air 50 to the axial direction through the core turbine engine 16 is usually performed by the intake channel 54. The change of direction is reversed in that the bulk direction of the flow of air 50 (itself having a circumferential swirl component imparted by the propeller blades 40 in addition to a longitudinal component) is opposite, or reverse, to the bulk direction of air flow axially through the core turbine engine 16 (which itself also includes a longitudinal component but also include radial and circumferential components owing to the shape of the flow path and swirl induced by rotating turbomachinery components) during one or more phases of operation of the core turbine engine 16. Thus, it will also be appreciated that the term "reverse" is a relative comparison of the longitudinal components of the bulk flow of air 50 and bulk flow of air axially within the engine 10. Though the longitudinal direction of the flow of air 50 may not be perfectly parallel with the axial flow of air through the engine 10, it will be appreciated that the longitudinal components of the directions the flow of air 50 and the axial flow are reversed.

Compressor 22 includes one or more sequential stages of compressor stator vanes 60, one or more sequential stages of compressor rotor blades 62, and an impeller 64. Though the illustrated embodiment includes both axial and centrifugal flow compressors, in some forms the turboprop engine 10 can include just an axial flow compressor(s) or centrifugal flow compressor(s). The one or more sequential stages of compressor stator vanes 60 are coupled to the outer casing 18 and compressor rotor blades 62 are coupled to HP shaft 34 to progressively compress the air 53. Impeller 64 further compresses air 53 and directs the compressed air 53 into combustion section 26 where air 53 mixes with fuel. Combustion section 26 includes a combustor 66 which combusts the air/fuel mixture to provide combustion gases 68.

Combustion gases 68 flow through HP turbine 28 which includes one or more sequential stages of turbine stator vanes 70 and one or more sequential stages of turbine blades 72. The one or more sequential stages of turbine stator vanes 70 are coupled to the outer casing 18 and turbine blades 72 are coupled to HP shaft 34 extract thermal and/or kinetic energy therefrom. Combustion gases 68 subsequently flow through LP turbine 30, where an additional amount of energy is extracted through additional stages of turbine stator vanes 70 and turbine blades 72 coupled to LP shaft 36. The energy extraction from HP turbine 28 supports operation of compressor 22 through HP shaft 34 and the energy extraction from LP turbine 30 supports operation of propeller section 14 through LP shaft 36. Combustion gases 68 exit turboprop engine 10 through exhaust section 32.

It will be understood that one or more rows of stator vanes 60 and 70 can be variable vanes controlled by a controller (see below with respect to controller 100) in one form. Furthermore, with particular respect to stator vanes 70, one or more rows of the stator vanes 70 can be variable.

In other exemplary embodiments, the turbine engine may include any suitable number of compressors, turbines, shafts, etc. For example, as will be appreciated. HP shaft 34 and LP shaft 36 may further be coupled to any suitable device for any suitable purpose. For example, in certain exemplary embodiments, turboprop engine 10 of FIG. 1 may be utilized in aeroderivative applications. Additionally, in other exemplary embodiments, turboprop engine 10 may include any other suitable type of combustor, and may not include the exemplary reverse flow combustor depicted.

The embodiment of turboprop engine 10 illustrated in FIG. 1 includes an electric machine 74 located aft of the core turbine engine 16 and rotatingly coupled to the LP shaft 36. In some forms the electric machine 74 is contained in an environmentally sealed housing which can be pressurized to minimize electrical corona and discharge effects. Further, in some forms the LP shaft 36 and electric machine 74 can be configured to rotate at a constant speed from idle to max power, with thrust of the engine 10 controlled by the variable pitch propeller 38.

Given the coaxial relationship of the LP shaft 36 with the HP shaft 34, in such an embodiment the LP shaft 36 is configured to extend aft of the core turbine engine 16, and also further aft than the HP shaft 34, despite the HP compressor 22 being the upstream-most compressor of the turboprop engine 10 (i.e., despite there being no low-pressure compressor upstream of the HP compressor 22 and downstream of the inlet 52).

The electric machine 74 can be used in many different power configurations. In one form the electric machine is configured to extract power from the LP shaft 36 when the machine 74 operates as a generator. The extraction of mechanical power from the LP shaft 36 and conversion to electric power can be used to charge an on-board power storage device such as a battery, or alternatively to provide power to another electrical device (e.g., an electric motor, an electrical accessory on an aircraft, etc.). In other forms, the electric machine 74 can be used as a motor to provide power to the LP shaft 36 to supplement power extracted by the LP turbine 30 from the combustion gases 68. In these forms, the electric machine 74 can be configured to provide a minimum of 10% of supplemental thrust to the engine 10, a minimum of 20% of supplemental thrust to the engine 10, and up to 40% of supplemental thrust to the engine 10 in various embodiments. In still other forms, the electric machine 74 can be configured to power to drive 100% of thrust from the propeller section 14. A scenario in which the electric machine 74 provides all power to the propeller section 14 can include shutdown of the engine 10. In one non-limiting example of an engine being shut down, upon or near landing the engine 10 can be commanded to shut down and the electric machine 74 used to drive further propeller thrust requirements, whether that includes fine power on short-final or power when the propeller section 14 is configured in reverse pitch to aid in slowing the aircraft.

A battery or other secondary power source can be used to provide power to the electric machine 74 when operated as a motor. The supplementation of power by the electric machine 74 to the LP shaft 36 in this manner can be transitory or steady state, depending on the control requirements requested of the turboprop engine. For example, in those operating conditions in which power output of the engine lags behind a commanded power, the electric machine 74 can provide near instantaneous supplemental power to the LP shaft 36 to provide on-condition power output from the turboprop until the engine 10 achieves a steady state operating condition at the higher output power. In still further forms, the electric machine can be operated as a motor in some portions of operation of the engine 10, and as a generator in other portions of operation of the engine 10, along the lines of any of the variations discussed herein.

Given the proximity of the electric machine 74 to the intake channel 54, the electric machine 74 can be further positioned to exchange heat with the inlet portion of the air 53 traversing the intake channel 54 to aid in removing heat from the electric machine 74. Cooling of the electric machine 74 using the inlet portion of air 53 permits tighter packaging of the electric machine 74 and closer location of the electric machine 74 to heat generating portions of the engine 10. The relative location of the electric machine 74 and intake channel 54 can permit an effective exchange of heat through any number of useful mechanisms including at least one of conduction and convection cooling. In some forms cooling air may directly impinge upon the electric machine 74 and/or may be used to vent a cavity in which the electric machine 74 is located. In still further forms the electric machine 74 can be used in part to form the flow path of the intake channel 54 to provide direct heat transfer between the electric machine 74 and the inlet portion of air 53. In yet still further forms the electric machine 74 may be in direct contact with a portion of the intake channel 54 forming the flow path such that heat transfer occurs between the electric machine 74 and inlet portion of air 53 via that particular portion of the intake channel 54 forming the flow path. Further aspects of the location of electric machine 74 and various cooling techniques are described further below.

Various other embodiments are disclosed further herein related to the location and use of the electric machine 74, the shape and configuration of the intake channel 54, and various techniques to exchange heat between the electric machine 74 and the inlet portion of air 53 flowing in the intake channel 54. As will be appreciated, like reference numerals refer to like elements and, thus, any of the variations disclosed herein related to any particular exemplary embodiment in any given figure are also applicable to embodiments depicted and discussed with respect to the other figures.

Figure 2:
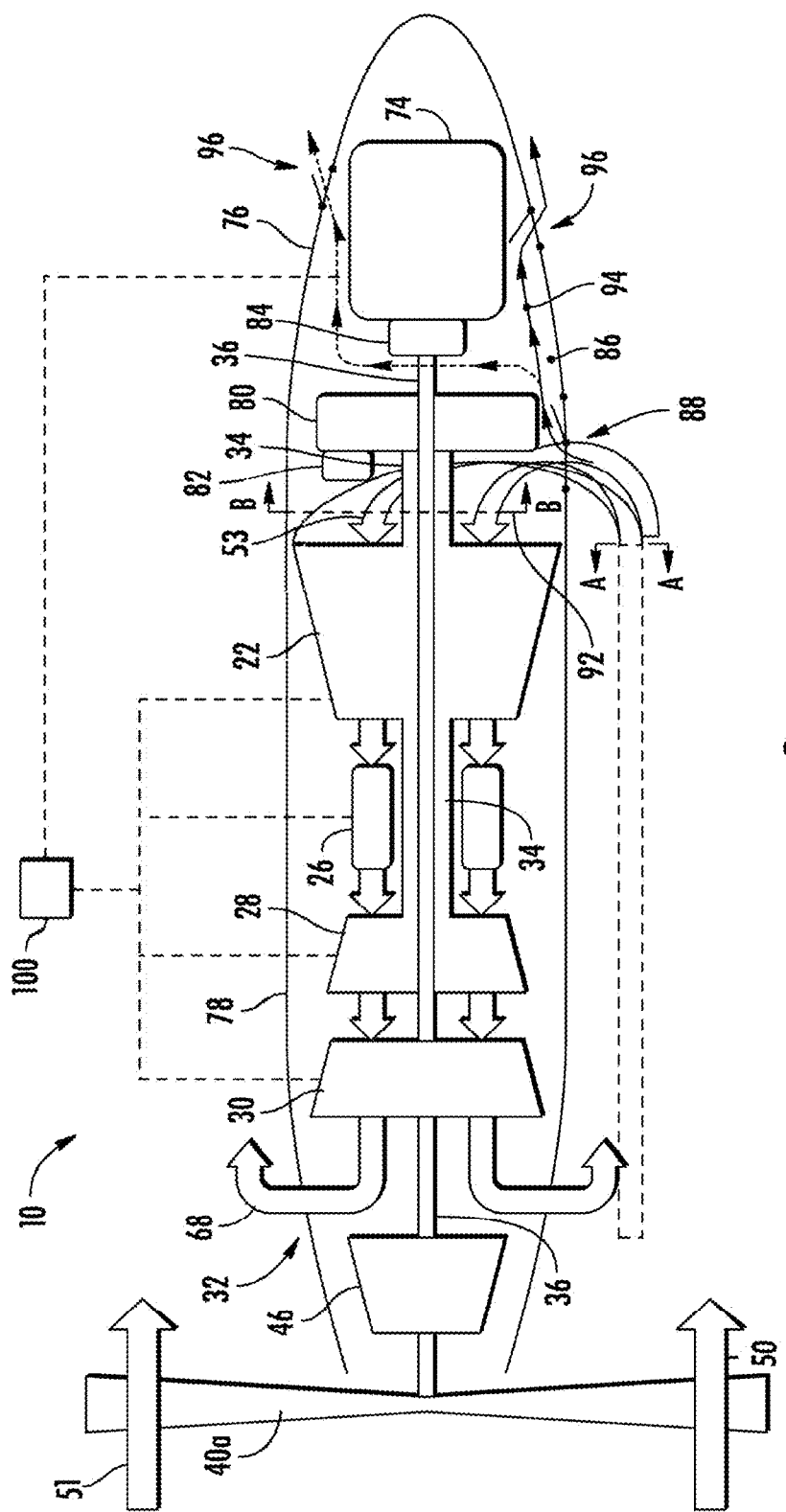
FIG. 2 is a schematic view of a gas turbine engine with an electric machine in accordance with the present disclosure.

Turning now to FIG. 2, an exemplary embodiment of the turboprop engine 10 is illustrated in which the engine 10 includes an electric machine 74 located aft of the core turbine engine 16 in a tail cone 76 defining an aft end of an engine nacelle 78. As will be appreciated, the engine nacelle 78 is used to enclose the gas turbine engine and includes one or more portions that interface with aircraft structure such as a wing, pylon, fuselage, etc. The tail cone 76 may be a complete body of revolution that circumferentially encloses the electric machine 74 in some embodiments. In alternative embodiments, however, the tail cone 76 may be a partial body of revolution or other shape that covers the electric machine to complete an enclosure with other aircraft structure (e.g., wing, pylon, fuselage, etc.). Thus, the tail cone 76 is any suitable structure of the engine nacelle which is located aft of the core turbine engine 16 and is used to wholly or partially enclose the electric machine 74.

In some forms of the embodiments disclosed herein the engine nacelle 78 may take on the form of an engine cowling when the engine 10 is installed on a single engine turboprop aircraft. In such installations the electric machine 74 can be located between the core turbine engine 16 and a firewall of the aircraft. In such installations, therefore, the engine cowling or other forebody structure of the aircraft can be used to enclose the electric machine 74.

The embodiment of FIG. 2 includes an accessory gear box (AGB) 80 located aft of the HP compressor 22 and is coupled to a starter motor 82. The starter motor 82 is coupled to the HP shaft via the AGB 80 such that during a start sequence of the turboprop engine 10 the starter motor 82 can be used to impart rotational power via the AGB 80 to the HP shaft 34. In the illustrated embodiment, the AGB 80 is depicted as being co-axial with the HP shaft 34 and LP shaft 36 (it will be appreciated that although the AGB 80 is rotatingly coupled to the HP shaft 34, it is not otherwise rotatingly coupled with the LP shaft 36). To provide such a coaxial relationship between the HP shaft 34 and AGB 80, in one form the AGB 80 is a planetary gear system in which the HP shaft 34 is coupled to a sun gear of the planetary gear system. In other forms a central gear of the AGB 80 is coupled via one or more idler gears to the starter motor 82.

Other forms are also contemplated to permit a co-axial relationship between the AGB 80 and HP shaft 34. In other forms, however, the AGB 80 need not be co-axial with the HP shaft 34.

The electric machine 74 is also depicted in FIG. 2 as being coupled to the LP shaft 36 through a speed change device 84 which can be used to alter a speed ratio between the LP shaft 36 and the electric machine 74. In some forms, the speed change device 84 can be a transmission that provides a fixed speed ratio, but in other forms the transmission can provide variable speed ratios. In still other forms, the transmission can include a clutch mechanism to disengage the electric machine 74 from the LP shaft 36. Still further, although the embodiment depicted in FIG. 2 includes the speed change device 84, other embodiments need not include the device 84. In such an embodiment, the electric machine 74 is directly connected to the LP shaft 36.

Figure 7A:
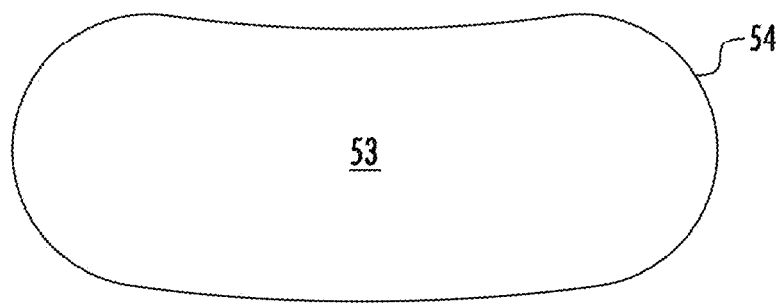
FIG. 7A is a cross sectional view of a non-annular portion of a flow path of an intake channel in accordance with the present disclosure.
Figure 7B:
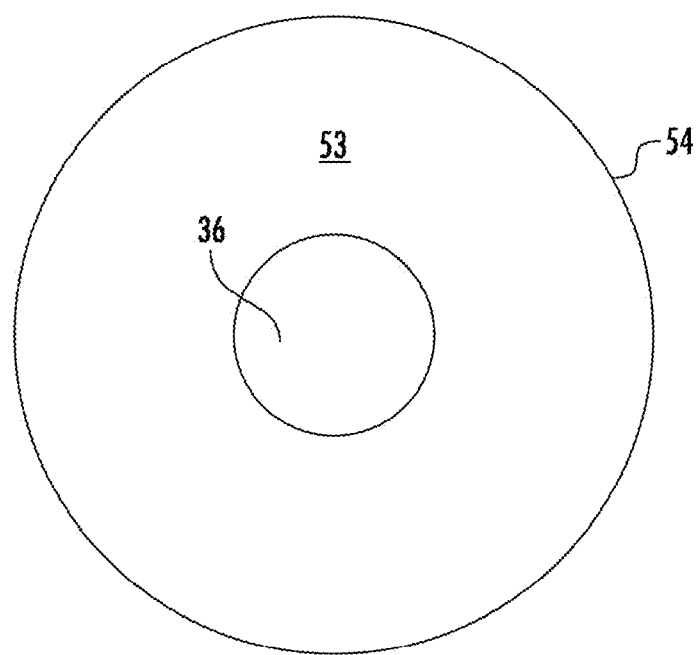
FIG. 7B is a cross sectional view of an annular portion of a flow path of an intake channel in accordance with the present disclosure.

The intake channel 54 forms a flow path between the AGB 80 and the HP compressor 22. The flow path of the intake channel 54 follows the route depicted in FIG. 2, where the inlet portion of air 53 captured by the intake channel 54 passes first through a non-annular inlet 90 depicted at sightline A-A (an embodiment of which is illustrated in FIG. 7A, discussed in more detail below) before it is split into an annular flow path 92 depicted at sightline B-B (an embodiment of which is illustrated in FIG. 7B, discussed in more detail below). The non-annular inlet 90 is radially offset from the LP shaft 36 and confined to a circumferential section about the LP shaft 36. The intake channel 54 takes the form of the annular shape leading up to the delivery of the inlet portion of air 53 to the HP compressor 22. The intake channel 54 thus begins with a non-annular intake shape and ends with an annular shape. As will be appreciated, the annular shape of the intake channel includes a central interior that accommodates the LP shaft 36. The intake channel 54 in the illustrated embodiment is thus required to morph, or change, from the non-annular shape at the inlet 90 to the angular shape at its discharge to the compressor 22 so that the intake channel 54 accommodates the intrusion of the LP shaft 36 through the intake channel 54 and to the electric machine 74. In this way, the IP shaft 36 extends through at least a portion of the intake channel 54 where the flow path in the intake channel 54 changes shape to accommodate the LP shaft 36. In some forms, an exterior surface of the LP shaft 36 may be exposed to the inlet portion of air 53 such that the inlet portion of air 53 flowing in the intake channel 54 is exposed to the rotating exterior surface of the LP shaft 36. In other forms, however, the intake channel 54 may include a separate structure used to define the central interior and which is used to separate the exterior surface of the LP shaft 36 from the inlet portion of air 53 flowing in the intake channel 54.

In some forms, the inlet 90 of the intake channel 54 is located at either a six o-clock position on the nacelle such as what would conventionally be considered the bottom, or underside, of the nacelle. An inlet on a Beechcraft Denali or Beechcraft King Air Turboprop are examples. The exhaust section 32 can be located at either or both of the three o'clock and nine o'clock position on the nacelle such as would conventionally be considered a left or right side of the nacelle. In this manner, the spacing of the inlet 90 of the intake channel 54 is circumferentially displaced from the exhaust section 32 to minimize/prevent exhaust gases from being circulated to the inlet 90 for ingestion into the engine 10. Furthermore, it will be appreciated that the inlet 52, though illustrated at an axially aft location in the various embodiments, can be located forward closer to the blades 40 while still maintaining the configuration to reverse the flow from the direction of the incoming flow of air 50 to the axial flow direction required in the turbine engine configurations depicted.

Also depicted in FIG. 2 is an offtake flow path 86 created by an offtake opening 88 provided in the intake channel 54 and which is configured to provide a flow of offtake air 94 to be used for heat exchange purposes with the electric machine 74. The offtake opening 88 can be located downstream of the inlet 90 to the intake channel 54 and is structured to remove part of the inlet portion of air 53 flowing through the offtake channel 86. The offtake opening 88 can be a permanent vent structure that includes a fixed opening through which air can pass regardless of mode of operation of the electric machine 74. In other forms, however, the offtake opening 88 can include a movable mechanical structure that permits modulating the area of the offtake opening 88, including in some forms fully closing the offtake opening. Such a movable mechanical structure can take any variety of forms such as a hinged plate, sleeve valve, or other suitable device.

The offtake flow path 86 can take a variety of forms including the solid line depicted in FIG. 2 in which the flow path 86 flows past the electric machine 74. In one form, the offtake flow path 86 can alternatively and/or additionally be routed along the dotted line shown in FIG. 2. Such a flow path can provide additional level of venting of the cavity in which the electric machine 74 is located, and/or provide greater dwell time within the cavity to ensure a higher level of heat exchange.

The offtake flow path can include one or more discharge openings 96 and 98 to permit the flow of offtake air 94 to exit from the nacelle 78. The flow of offtake air 94 can be urged to exit through a pressure differential that exists between the offtake opening 88 and the discharge openings 96 and/or 98. Such a pressure differential can be provide via ejector action if needed through suitable structure configured to provide such an action (e.g., a venturi ejector). One or both of the discharge openings 96 and 98, in some embodiments, can be a permanent vent structure that includes a fixed opening through which air can pass regardless of mode of operation of the electric machine 74.

In other forms, however, one or both of the discharge openings 96 and 98 can include a movable mechanical structure that permits modulating the area of the discharge openings 96 and 98, including in some forms fully closing the discharge openings. Such a movable mechanical structure can take any variety of forms such as a hinged plate, sleeve valve, or other suitable device. The moveable mechanical structure can protrude into a passing flow of air to which the discharged flow of offtake air 94 is being discharged, and in other forms can protrude into the offtake flow path 86.

Given the proximity of the electric machine 74 to the intake channel 54 and the configurations disclosed herein, various cooling techniques are contemplated with respect to the various embodiments. For example, though the passing flow of offtake air 94 is illustrated in FIG. 2 passing adjacent and/or around the electric machine 74, in some embodiments, the passing flow of offtake air 94 can be directed to impinge directly upon a portion of the electric machine. Further, a surface of the electric machine 74, such as an outer housing, can form part of the flow path of the offtake flow path 86. In other forms, a structure forming the offtake flow path 86 can be in heat conductive relationship with a portion of the electric machine 74 (e.g., a housing of the electric machine 74).

The embodiment depicted in FIG. 2 also includes a controller 100 configured to control various aspects of the depicted embodiment (the embodiment depicted in FIG. 1 can also include a controller for control of analogous features). As depicted through the various dotted lines, the controller 100 can control one or more different systems associated with operation of the engine 10. The dotted nature depicted in the figure denotes the optional inclusion of one or more, or all, of the systems connected with the controller 100. For example, the controller 100 can be used to control variable stator vanes 70 in either or both turbines 28 and 30. Additionally and/or alternatively, the controller 100 can be used to control variable stator vanes 60 in the compressor 22. Additionally and/or alternatively, the controller 100 can be used to control fuel flow to the combustion section 26. Additionally and/or alternatively, the controller 100 can be used to control one or more of the openings of the openings 88, 96, and 98. Additionally and/or alternatively, the controller 100 can be used to control operation of the electric machine 74. Additionally and/or alternatively, the controller 100 can command fuel flow to the combustion section 26 to be stopped and also simultaneously command the propeller section 14 to be positioned in a forward or reverse pitch configuration.

The controller 100 can thus be used in any or all of the following examples. The controller 100 may selectively drive the electric machine 74 as a generator. In those situations in which the electric machine 74 is 'powered on' to operate as a generator, the controller 100 can make adjustments to fuel rate delivery to the combustion section 26 while also optionally changing position of variable stator vanes 60 and/or 70. The controller 100 can optionally operate a clutch in the speed change device 84.

Figure 3:
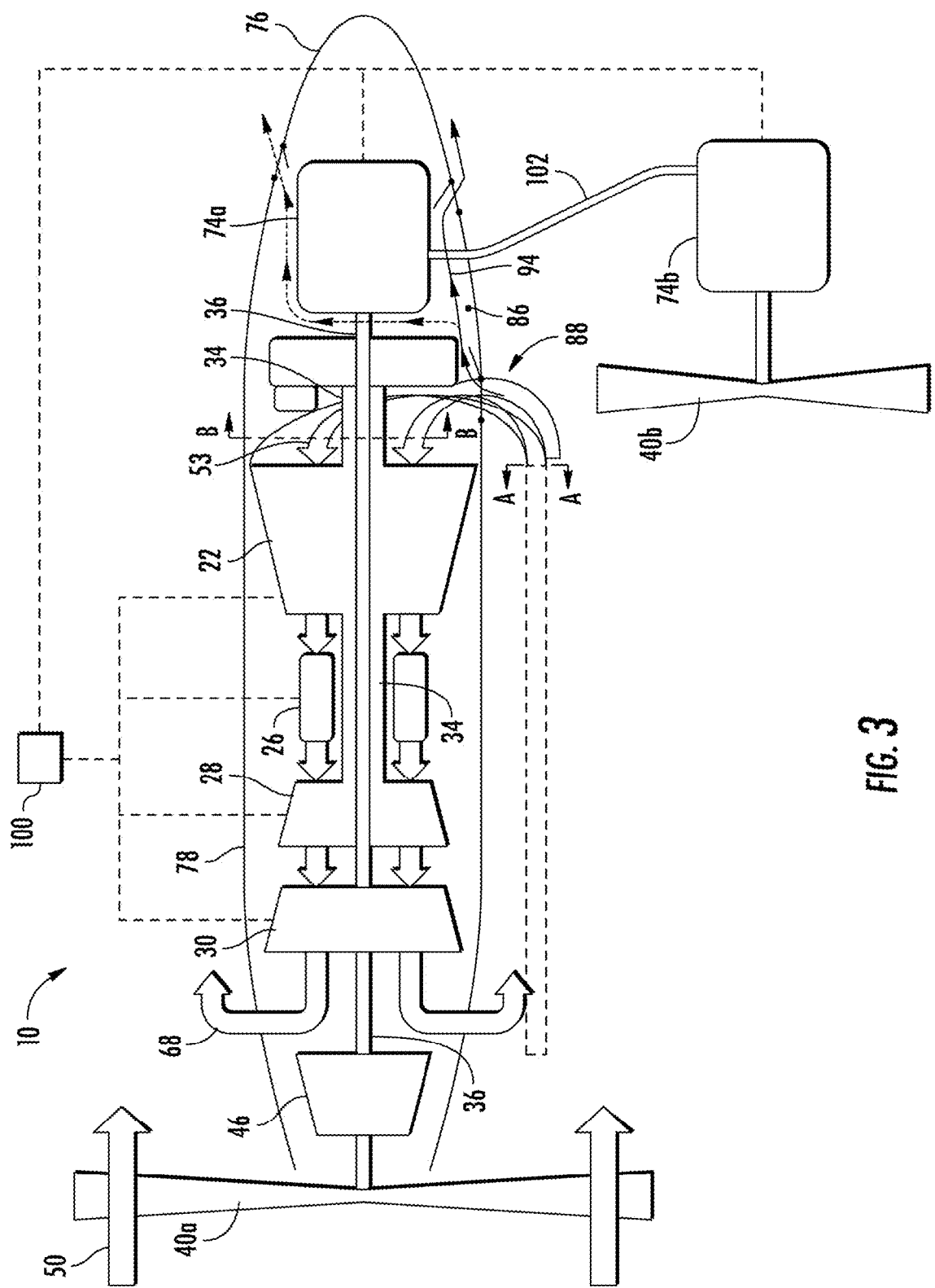
FIG. 3 is a schematic view of a gas turbine engine with an electric machine in accordance with the present disclosure.

Turning now to FIG. 3, another embodiment of the reverse flow engine 10 discussed above is illustrated. The exemplary engine 10 of FIG. 3 may be configured in substantially the same manner as the exemplary engine 10 of FIG. 2, and as such the same or similar numbers may refer to the same or similar parts.

For the embodiment of FIG. 3, the engine 10 includes an electric machine 74 coupled to the engine 10 and operated as a generator, the electric machine 74 further in electrical communication via a power conduit 102 with an electric machine 74b which is operated as a motor. The electric machine 74b operated as a motor is used to drive a set of propeller blades 40b apart from the blades 40a driven by the turbine engine 10 depicted at the top of FIG. 3. The electric machine 74b configured as a motor can be used to provide additional thrust output beyond that provided by the propeller blades 40a driven by the turbine engine 10.

Although the electric machine 74b is illustrated apart from any turbomachinery components such as those at the top of the figure, in some embodiments the electric machine 74b can be integrated with a gas turbine engine much in the same manner as the turboprop engine 10 depicted at the top of the figure. In these embodiments, the electrical coupling between the electric machines 74a and 74b can be used to exchange power between the two (e.g., where one machine is a motor and the other a generator) or can be coupled to a common energy storage device (e.g. a bank of batteries). Any of the variations in the embodiments discussed above are also applicable to the embodiments shown in FIG. 3, such as but not limited to heat exchange between the electric machine 74 and the inlet portion of air 53, the offtake flow path 86, etc.

Figure 4:
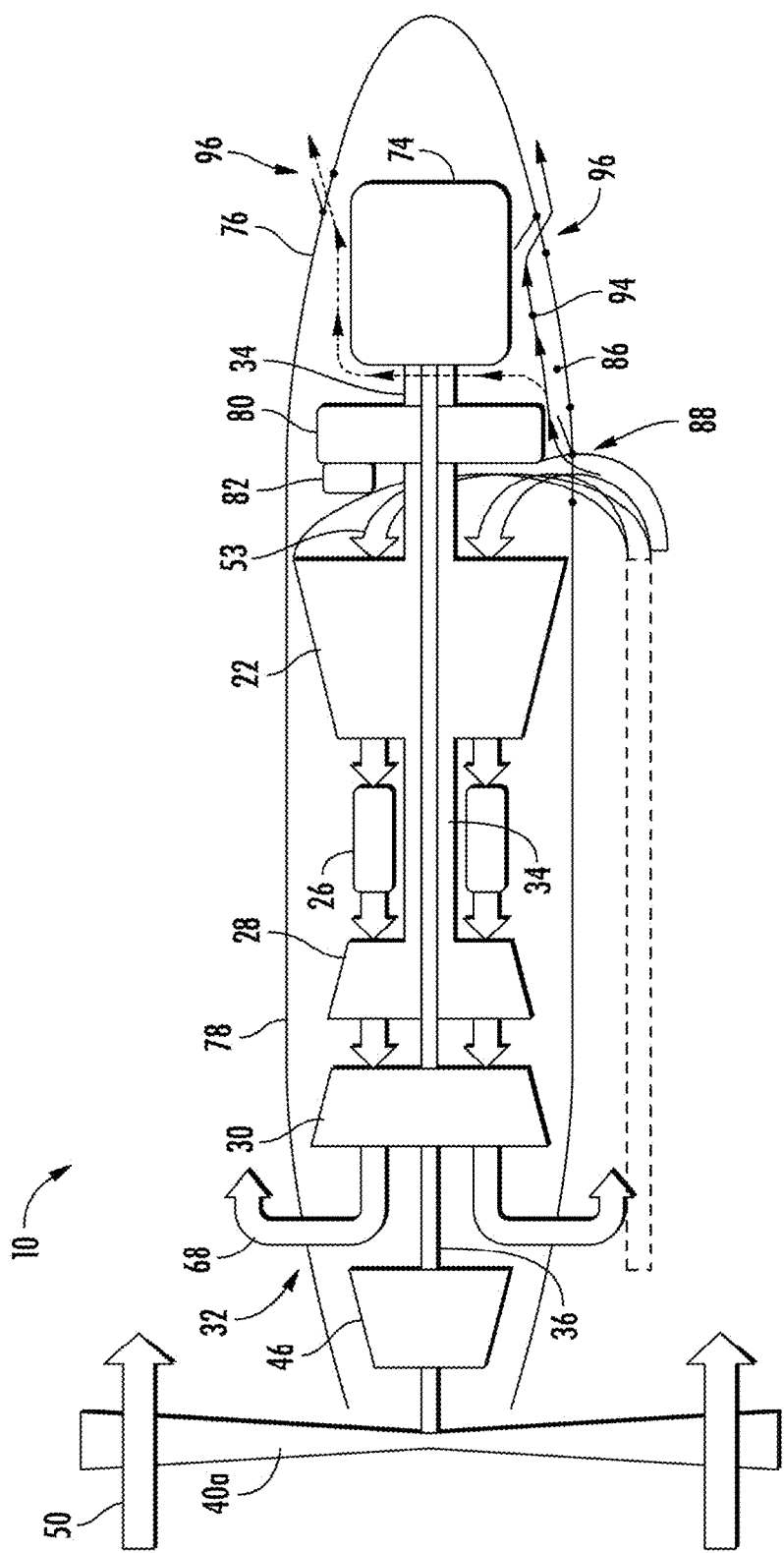
FIG. 4 is a schematic view of a gas turbine engine with an electric machine in accordance with the present disclosure.

Turning now to FIG. 4. another embodiment of the reverse flow engine 10 discussed above is illustrated. The exemplary engine 10 of FIG. 4 may be configured in substantially the same manner as the exemplary engine 10 of FIG. 2, and, as such, the same or similar numbers may refer to the same or similar parts.

For the embodiment of FIG. 4, the engine 10 includes an electric machine 74 coupled to the HP shaft 34 of the engine 10, in which the configuration can employ the electric machine 74 as either a motor (e.g., to start the engine 10) or a generator (e.g., to scavenge power for electric power generation). As will be appreciated in this embodiment, the LP shaft 36 need not be extended to the rear of the engine 10.

Figure 5:
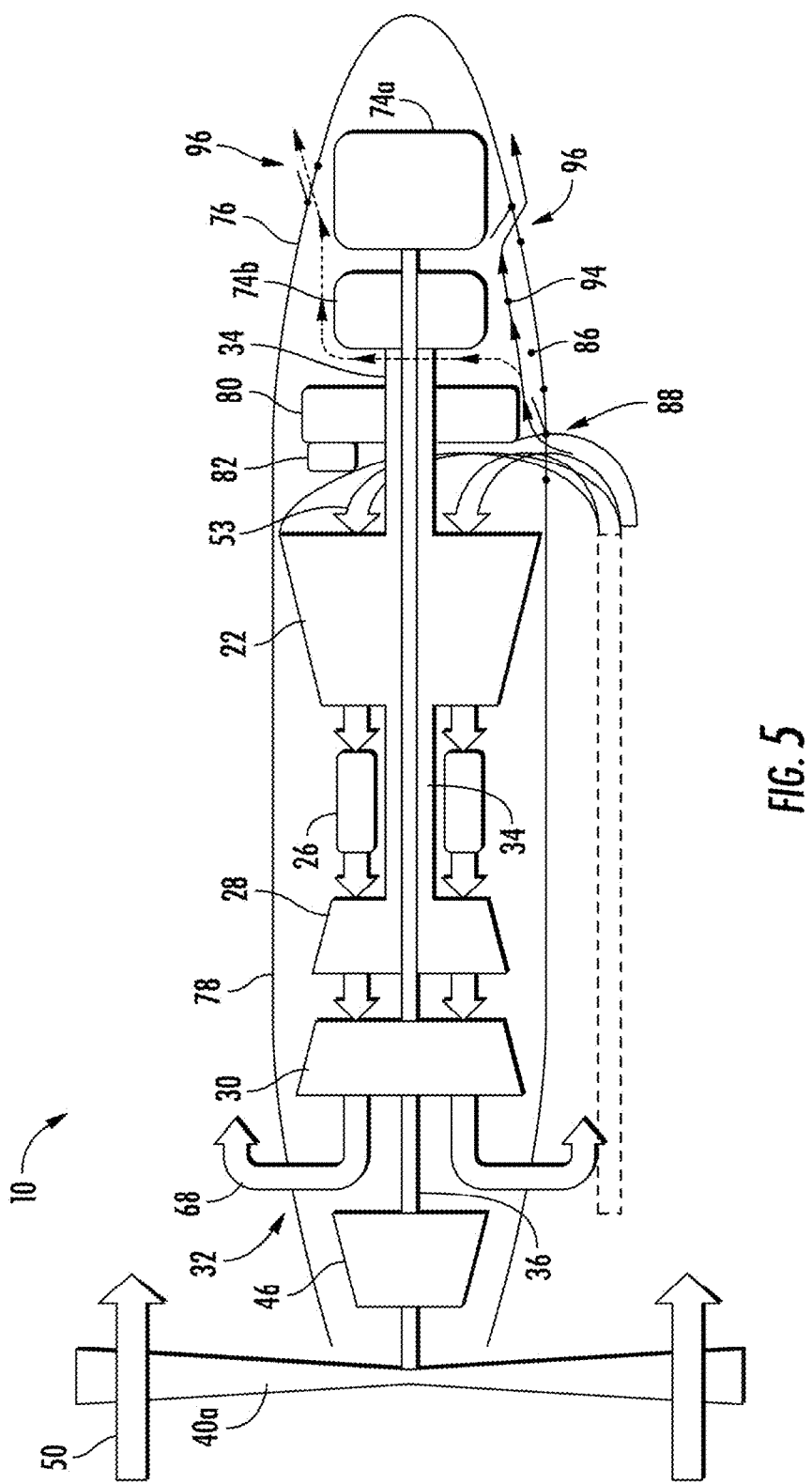
FIG. 5 is a schematic view of a gas turbine engine with an electric machine in accordance with the present disclosure.

Turning now to FIG. 5. another embodiment of the reverse flow engine 10 discussed above is illustrated. The exemplary engine 10 of FIG. 5 may be configured in substantially the same manner as the exemplary engine 10 of FIG. 2, and as such the same or similar numbers may refer to the same or similar parts.

For the embodiment of FIG. 5, the engine 10 includes electric machines 74a and 74b, each coupled with respective LP shaft 36 and HP shaft 34. This embodiment enables power input/extraction to/from either spool 34,36 independently, as well as the potential to transfer power between the two spools 34,36 of the engine to improve operability/mitigate vibration, compressor stall or instability issues. As will therefore be appreciated, power can be extracted from spool 34 and provided to spool 36 in one mode of operation, power can be extracted from spool 36 and provided to spool 34 in another mode of operation, and power can be either extracted from or provided to both spools 34,36 in yet another mode of operation.

Any of the electric machines discussed herein are capable of being packaged so as to provide power densities suitable for use in the applications discussed herein. For example, the electric machines can have a power density ranging anywhere from greater than 3 kW/kg, greater than 5 kW/kg, and greater than 6 kW/kg.

As noted, the exemplary controller 100 useful in any of FIGS. 2-5 is configured to regulate any of the aforementioned systems such as variable stator vanes 60 and/or 70, electric machine 74, fuel flow to the combustion section 26, etc., either alone or in combination, based on a control scheme stored in the controller 100. In one or more exemplary embodiments, the controller 100 depicted in FIGS. 2 and 3 may be a stand-alone controller 100 for any of the aforementioned systems, or alternatively, may be integrated into one or more of a controller for the gas turbine engine with which the aforementioned systems are integrated, a controller for an aircraft including the gas turbine engine with which the aforementioned systems are integrated, etc.

Figure 6:
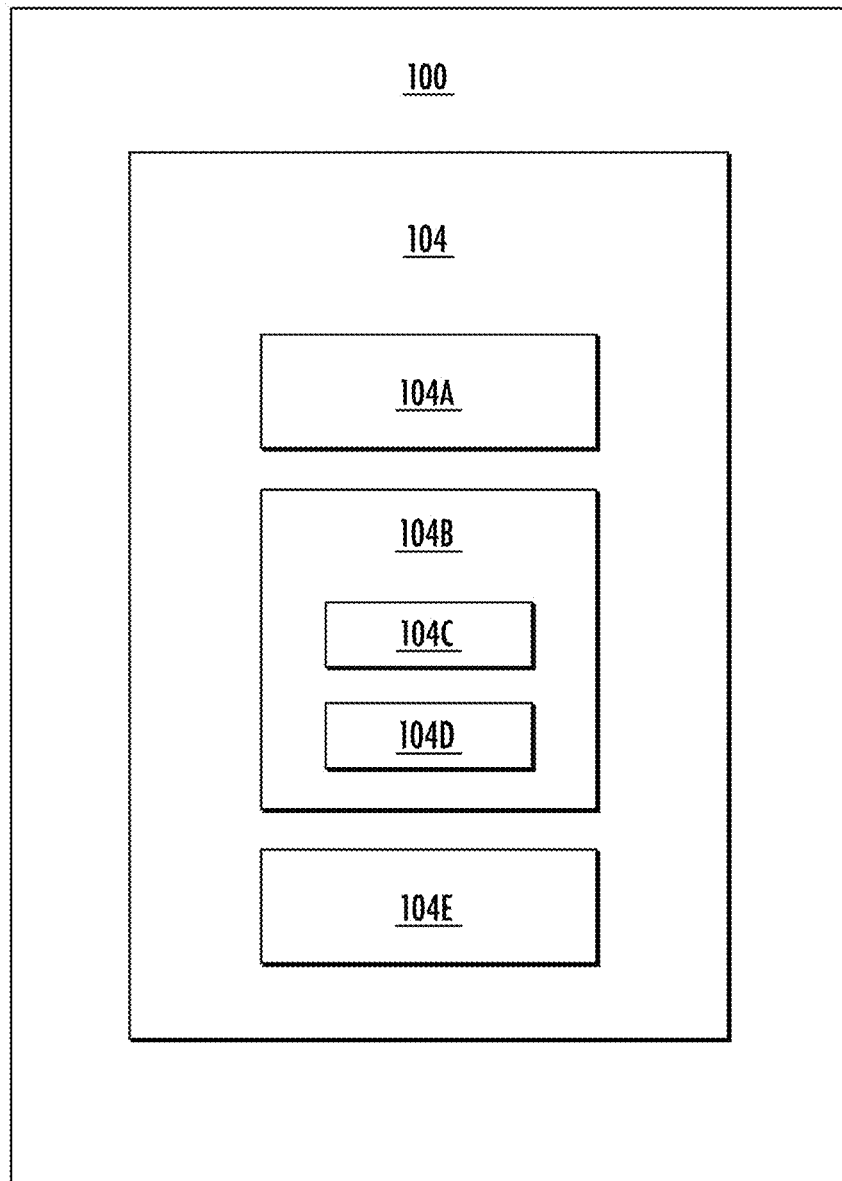
FIG. 6 is a view of a controller in accordance with the present disclosure.

Referring particularly to the operation of the controller 100, in at least certain embodiments, the controller 100 can include one or more computing device(s) 104 such as depicted in FIG. 6. The computing device(s) 104 can include one or more processor(s) 104A and one or more memory device(s) 104B. The one or more processor(s) 104A can include any suitable processing device, such as a microprocessor, microcontroller, integrated circuit, logic device, and/or other suitable processing device. The one or more memory device(s) 104B can include one or more computer-readable media, including, but not limited to, non-transitory computer-readable media, RAM, ROM, hard drives, flash drives, and/or other memory devices.

The one or more memory device(s) 104B can store information accessible by the one or more processor(s) 104A, including computer-readable instructions 104C that can be executed by the one or more processor(s) 104A. The instructions 104C can be any set of instructions that when executed by the one or more processor(s) 104A, cause the one or more processor(s) 104A to perform operations. In some embodiments, the instructions 104C can be executed by the one or more processor(s) 104A to cause the one or more processor(s) 104A to perform operations, such as any of the operations and functions for which the controller 100 and/or the computing device(s) 104 are configured, the operations for any of the aforementioned systems such as variable stator vanes 60 and/or 70, electric machine 74, fuel flow to the combustion section 26, etc., as described herein, and/or any other operations or functions of the one or more computing device(s) 104. The instructions 104C can be software written in any suitable programming language or can be implemented in hardware. Additionally, and/or alternatively, the instructions 104C can be executed in logically and/or virtually separate threads on the one or more processor(s) 104A. The one or more memory device(s) 104B can further store data 104D that can be accessed by the one or more processor(s) 104A. For example, the data 104D can include data indicative of power flows, data indicative of engine/aircraft operating conditions, and/or any other data and/or information described herein.

The computing device(s) 104 can also include a network interface 104E used to communicate, for example, with the other components of system (e.g., via a communication network). The network interface 104E can include any suitable components for interfacing with one or more network(s), including, for example, transmitters, receivers, ports, controllers, antennas, and/or other suitable components. One or more devices can be configured to receive one or more commands from the computing device(s) 104 or provide one or more commands to the computing device(s) 104.

The network interface 104E can include any suitable components for interfacing with one or more network(s), including, for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Turning now to FIGS. 7A and 7B, cross sectional views of two separate flow stations along the flow path of the intake channel 54 are illustrated. FIG. 7A illustrates view A-A from FIGS. 2 and 3, above, which depicts a cross section of the intake channel 54 that routes an inlet portion of air 53 of the flow of air 50. The cross-section A-A depicted in FIG. 7A is at or close to the inlet of the intake channel 54 and bas a non-annular flow shape. The non-annular flow shape depicted in FIG. 7A is similar to a kidney shape in the illustrated embodiment, but other non-annular shapes are also contemplated. The cross-section B-B depicted in FIG. 7B, from FIGS. 2 and 3 above, is at or close to the discharge of the intake channel 54 as it delivers the inlet portion of air 53 of the flow of air 50 to the compressor 22. The annular flow shape depicted in FIG. 7B encloses the LP shaft 36.

Figure 8:
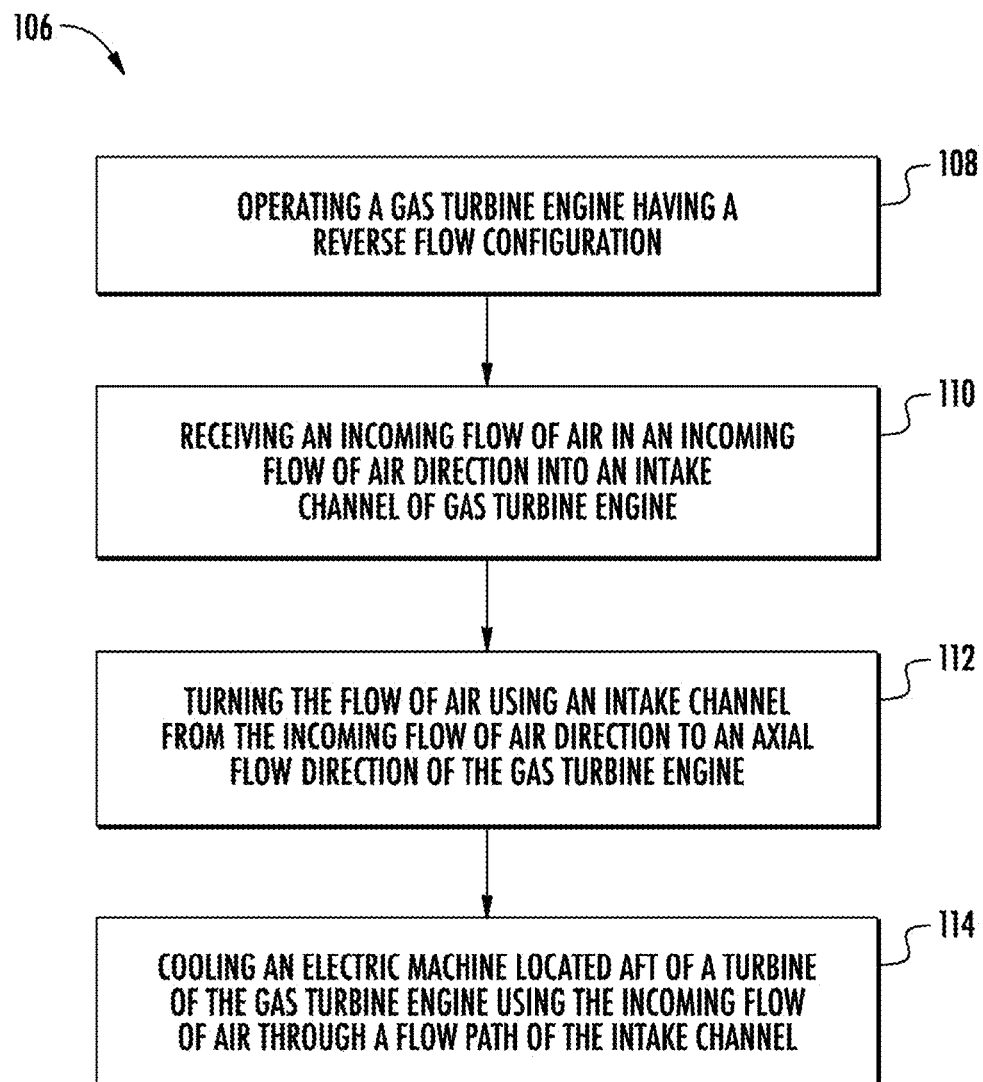
FIG. 8 is a flow chart describing a method of operating a gas turbine engine having an electric machine in accordance with the present disclosure.

Referring now to FIG. 8, a flow diagram of a method of operating a gas turbine engine in accordance with an exemplary aspect of the present disclosure is provided. The method of FIG. 7 may be utilized to operate one or more of the exemplary engine and electric machine placement described above with reference to FIGS. 1 through 5B. Accordingly, it will be appreciated that the method may generally be utilized to operate a gas turbine engine including engine 10, electric machine 74, and intake channel 54. However, in other exemplary aspects, the method may additionally or alternatively be utilized to operate any other suitable gas turbine engine.

More specifically, FIG. 8 discloses a method 106 of operating a reverse flow gas turbine engine which includes at 108 operating a gas turbine engine having a reverse flow configuration. The engine can take the form of a turboprop as discussed above in various embodiments. Step 110 includes receiving an incoming flow of air into an intake channel of the gas turbine engine. The flow of air received in the intake channel is turned at step 112 from its initial flow direction into an axial flow direction of the gas turbine engine. Step 114 discloses cooling an electric machine located aft of a turbine of the gas turbine engine using the flow of air in the intake channel.

The arrangement of the electric machine 74 coupled with the low pressure shaft 36 and located on a side of the high pressure compressor 22 opposite the high pressure turbine 28 provides various technical effects, including the ability to cool the electric machine 74 using the intake flow of air. Such a placement provides for additional separation from hot section components of the engine 10. The electric machine 74 can be placed in proximity to the intake channel 54 at an aft end of the engine 10 in a heat exchange relationship, where the intake flow of air can exchange heat through either or both of conduction and convection with the electric machine 74. In some forms an offtake flow of air can be extracted from the intake flow of air for use in cooling the electric machine 74 in lieu of the intake flow of air for additional flexibility, such as selective cooling provided through activation of discharge openings 96,98. Various other flexible arrangements can also be provided of the electric machine 74, and specifically cooling of the electric machine. For example, an electric machine 74*b* can be coupled with the low pressure shaft 36, while another electric machine 74*a* is coupled with the high pressure shaft 34. Both of electric machines 74*a* and 74*b* can be located on a side of the high pressure compressor 22 opposite the high pressure turbine 28.

It will further be appreciated that, during operation, a turbine engine is exposed to high temperatures, high pressures, and high speeds. For example, the turbine engine will generate excessive heat via combustion in operation. An aircraft engine will utilize a cooling system to cool engine components that reach relatively high temperatures. An engine's structural hardware is designed to support internal flow passages, with internal holes and passages, to allow cooling fluid to access high temperature components. However, the engine's structural hardware lacks the ability to define and control a variety of temperature zones throughout various sections of the internal hardware, resulting in a high thermal gradient between internal components. Further, the high thermal gradients in an engine's hardware inhibits the reliability and life of a given component and, thus, the reliability and life of the aircraft engine.

In operation, an aircraft engine experiences relatively high amounts of vibration and noise. Excessive vibration between components of an engine's internal hardware results in considerable stress concentrations as well as accelerated part damage and reduction in engine life. In particular, associated (e.g., close, proximate, etc.) components of an engine's hardware are susceptible to such vibrations and subsequent damage.

To address some of the issues presented by known engine casings and internal hardware, examples disclosed herein provide partition damper seal configurations for segmented internal cooling hardware. In certain examples, an engine structure (e.g., an engine casing, passage, liner, etc.) includes an inner wall (e.g., inner band) and an outer wall (e.g., outer band), the outer wall spaced apart from the inner wall in a radial direction. In certain examples, a space between the inner and outer walls defines a flow passage (e.g., cooling fluid cavity). In certain examples, a body (e.g., wire, damping mechanism, rib, etc.) is positioned between the inner and outer walls. In certain examples, the body extends in a radial direction and traverses the inner and outer walls. In certain examples, the body is detachably coupled to an inner surface of the outer wall and an outer surface of the inner wall. In certain examples, the body is integral to the engine structure. In certain examples, the body detaches from the inner and outer surfaces to at least partially seal the flow passage. In certain examples, the body detaches in response to the outer wall moving relative to the inner wall (e.g., vibration, thermal expansion, etc.).

In some examples, a first notch is disposed on the inner surface and opposes a second notch on the outer surface. Additionally or alternatively, the body is positioned between the notches. In some examples, the body contacts the first and second notches to seal the flow passage. In some examples, the body is a rib disposed on the inner surface or the outer surface. In some examples, the rib is positioned on a surface opposing a second rib and a third rib, wherein the second or the third rib contact the body to seal the flow passage. In some examples, the body is a damping mechanism between the inner and outer walls.

In some examples, the body is a three-dimensional (3D) printed wire. Accordingly, the 3D printed wire is integral to the inner and outer surfaces of the walls. In some examples, a plurality of bodies is arranged and distributed between the inner and outer walls. In some examples, the plurality of bodies detaches from the inner and outer surfaces in response to the inner wall moving relative to the outer wall. In some examples, the plurality of bodies seals the flow passage.

In some examples, the flow passage includes apertures extending through the inner and outer walls. Accordingly, the flow passage can be implemented as a cooling system for the engine structure. In some examples, the inner wall moves relative to the outer wall due to the thermal expansion of the engine structure (e.g., during engine operation).

Example partition damper seal configurations disclosed herein can be applied to closed and open rotor engine designs.

Figure 9:
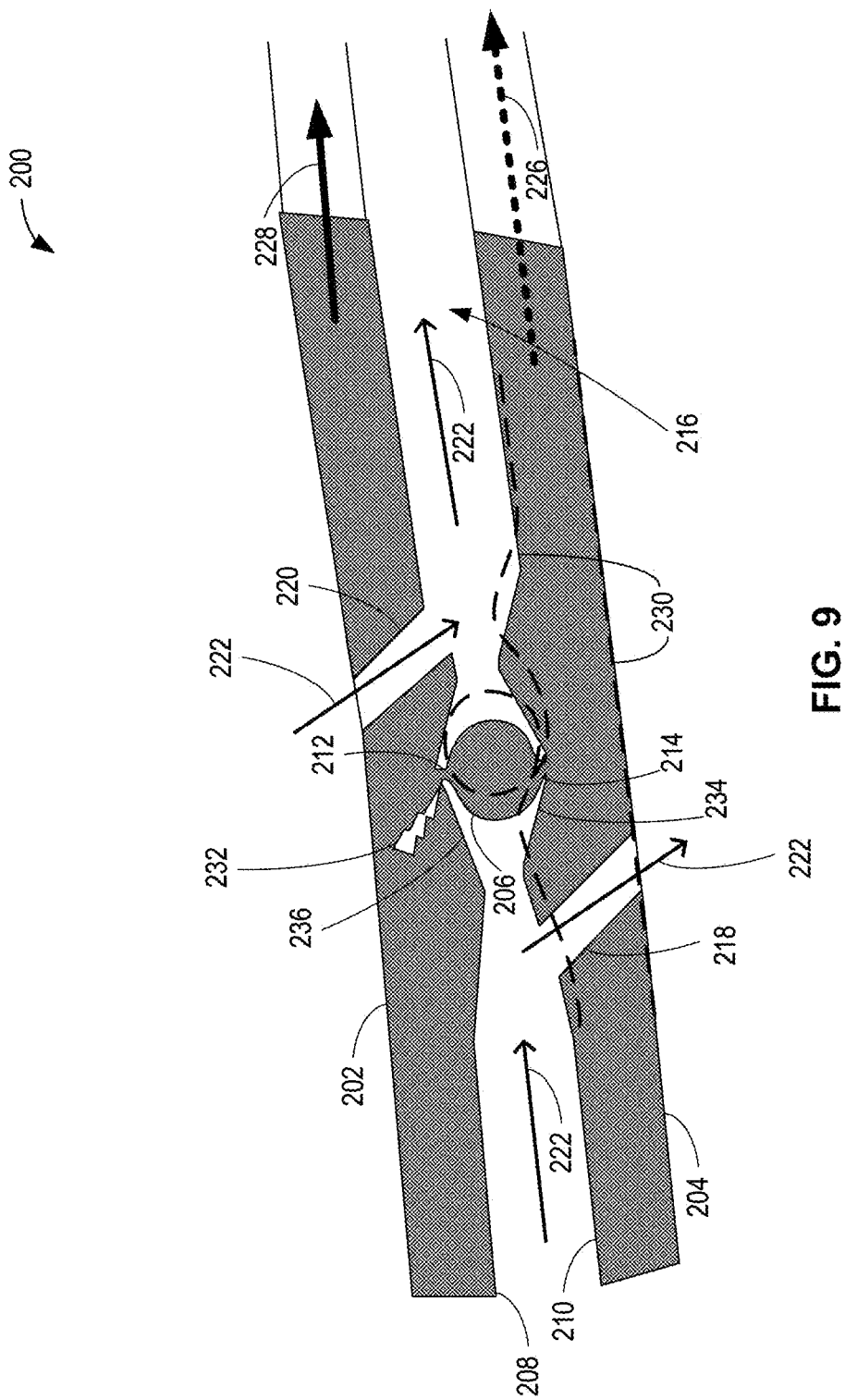
FIG. 9 is a cross-sectional view of an example sealing configuration that can be implemented in examples disclosed herein.

FIG. 9 is a cross-sectional view of an example sealing configuration 200. An example sealing configuration 200 includes an inner wall 202 and an outer wall 204. In some examples, the inner wall 202 and the outer wall 204 define an engine structure (e.g., engine casing, turbine shroud, combustor liner, rotor passage, etc.). The inner wall 202 and the outer wall 204 are spaced apart in a radial direction. In the example as depicted in FIG. 2, a body 206 is positioned between the inner wall 202 and the outer wall 204. The example body 206 is disposed on an outer surface 208 of the inner wall 202 and an inner surface 210 of the outer wall 204. Additionally or alternatively, the body 206 connects to the inner wall 202 and the outer wall 204 via a ligament 212 and a ligament 214, respectively.

In this example, the space between the inner wall 202 and the outer wall 204 defines a flow passage 216. The flow passage 216 has a first aperture 220 extending through the inner wall 202 and a second aperture 218 extending through the outer wall 204. In some examples, the apertures 218, 220 permit fluid flow to regions of an engine's internal hardware via the flow passage 216, in directions as generally indicated by arrows 222.

In the illustrated example, the outer wall 204 moves relative to the inner wall 202. For example, the inner wall 202 can thermally deflect in a direction as generally indicated by an arrow 228 and the outer wall 204 can thermally deflect in a direction as generally indicated by an arrow 226. The amount of the thermal expansion of the outer wall 204 is greater than the amount of the thermal expansion of the inner wall 202. Thus, the deflection of the outer wall 204 results in a second relative position of the outer wall 204 as depicted by outlines 230.

In the illustrated example of FIG. 9, the example body 206 is detachably coupled to the inner wall 202 and the outer wall 204 via the ligaments 212 and 214. In FIG. 9, the ligaments 212 and 214 are detachable (e.g., removable) connections between the body 206 and the walls 202, 204. In response to the outer wall 204 moving relative to the inner wall 202, a stress point 232 can occur at the ligament 212 such that the body 206 detaches from at least one of the outer wall 204 or the inner wall 202. The example outlines 230 depict the movement of the body 206 from a first location to a second relative location. In this example, the body 206 remains attached to the outer wall 204. In other examples, the body 206 detaches from both walls 202 and 204.

In the illustrated example, the surfaces 210 and 208 have a notch 234 and a notch 236, respectively, that extend into the flow passage 216. The body 206 is positioned between the notches 234 and 236. In response to the outer wall 204 moving relative to the inner wall 202, the body 206 contacts the notches 234 and 236 to at least partially seal (e.g., partially seal, fully seal, partially close, close, etc.) the flow passage 216.

Additionally or alternatively, the example body 206 can dampen (e.g., resist) the movement of the walls 202 and 204. For example, relatively high external forces (e.g., vibration, pressure, torque, etc.) within an example airfoil can exert variable force on at least one of the walls 202 or 204. In the example of FIG. 9, the body 206 can absorb (e.g., mitigate, dampen, etc.) forces exerted on the walls 202 and 204. Accordingly, the example body 206 can prevent damage of the walls 202 and 204 from external forces.

Figure 10:
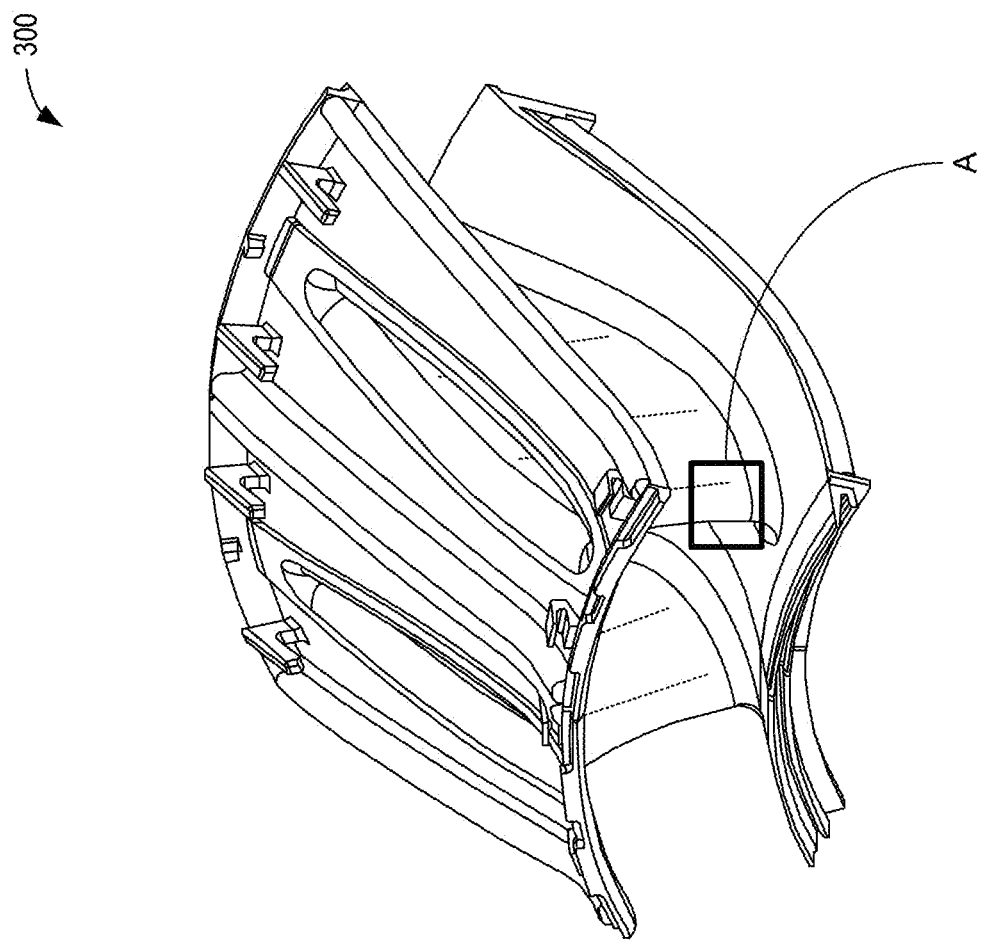
FIG. 10 illustrates an isometric view of an example strut fairing that can be implemented in examples disclosed herein.

FIG. 10 illustrates an isometric view of an example strut fairing 300 in which examples disclosed herein can be implemented. The example strut fairing 300 can be mounted in an engine casing. In this example, view A is a location of an example double walled airfoil of the strut fairing 300 that will be described in further detail in FIG. 11.

Figure 11:
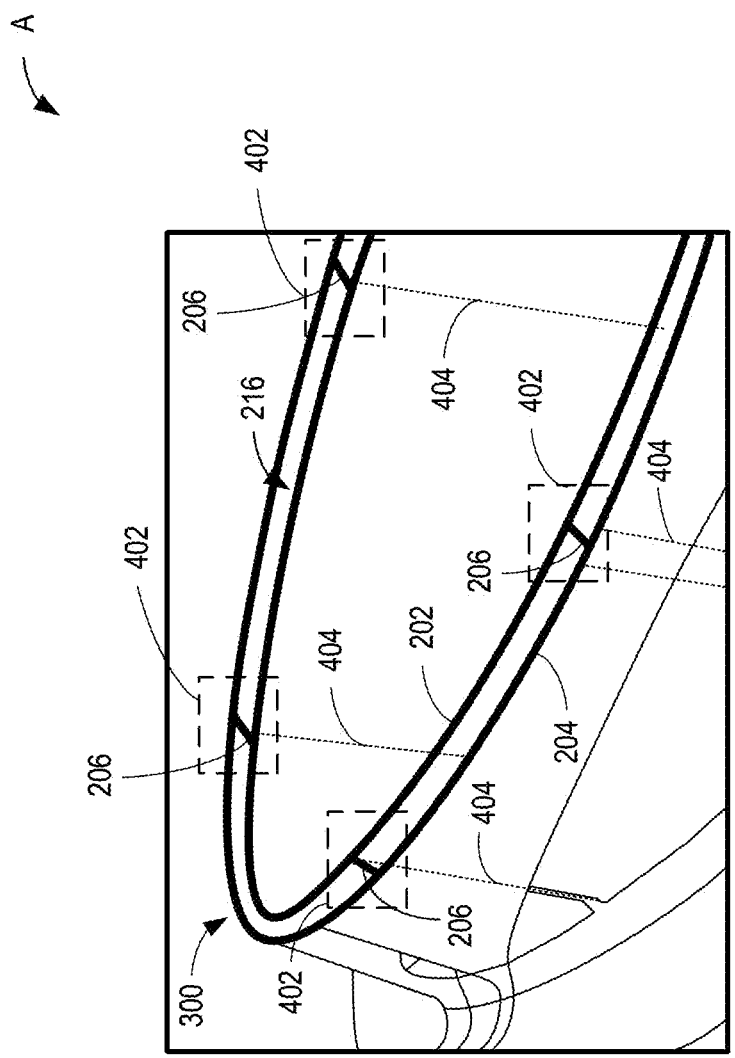
FIGS. 11 and 12 are cross-sectional views of the example fairing of FIG. 10.
Figure 12:
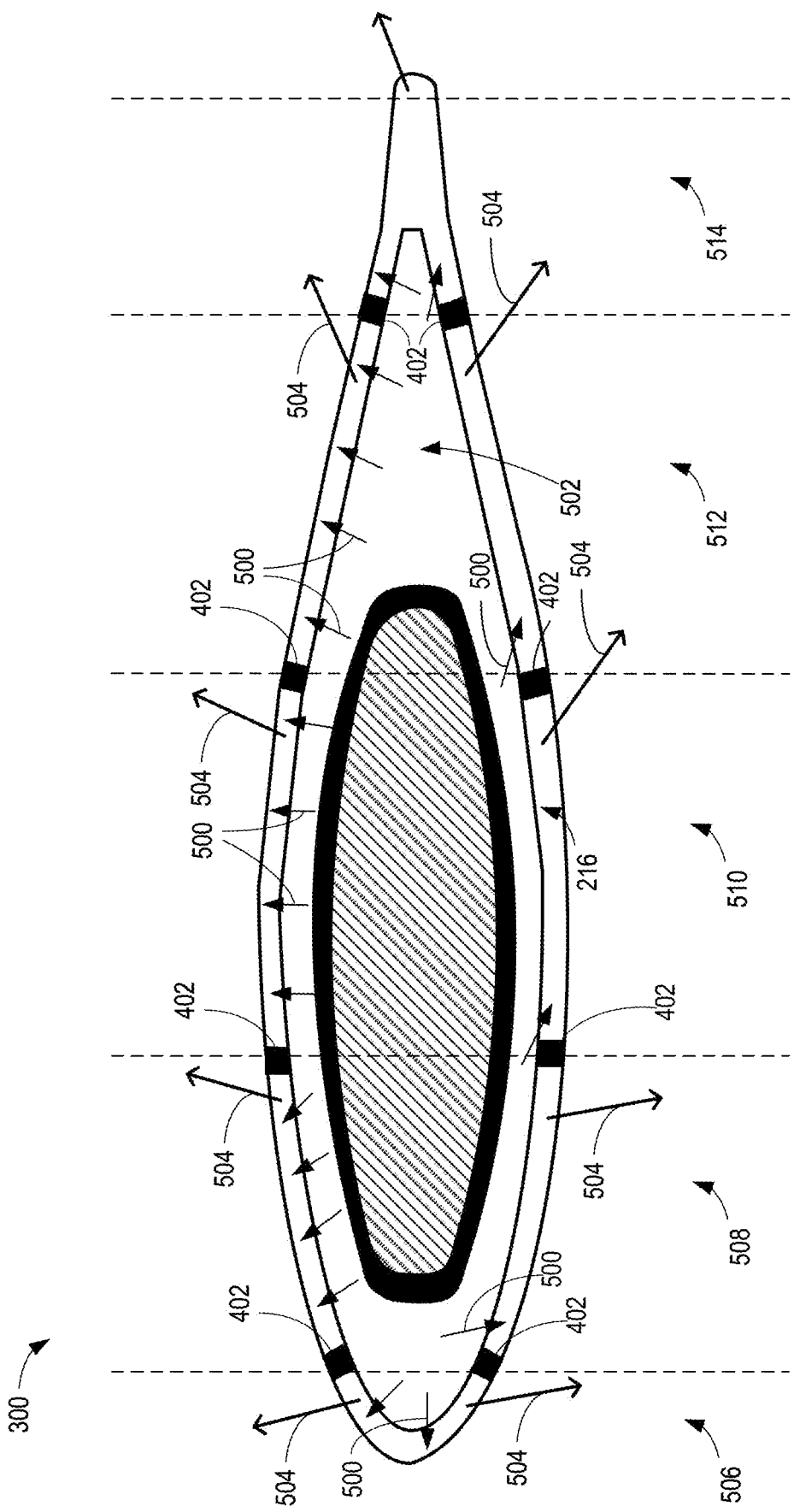

FIGS. 11 and 12 are cross-sectional views of the example strut fairing 300 of FIG. 10. FIG. 11 illustrates a partial view of the strut fairing 300. In particular, FIG. 11 illustrates the strut fairing 300 at view A of FIG. 10.

In the illustrated example of FIG. 11, the strut fairing 300 has example sealing configurations 402. The example sealing configurations 402 of FIG. 11 are similar to the example sealing configuration 200 of FIG. 2, but, instead, includes a plurality of sealing configurations 402 distributed throughout the strut fairing 300. In some examples, the example sealing configuration 200 can be implemented as the example sealing configuration 402. The sealing configurations 402 have bodies 206 positioned between the walls 202 and 204 and traverse the walls 202 and 204 in an axial direction, as generally indicated by lines 404.

The example strut fairing 300 includes a plurality of bodies 206 distributed between the inner wall 202 and the outer wall 204. Accordingly, the example sealing configurations 402 can at least partially seal the flow passage 216 in response to the outer wall 204 moving relative to (e.g., thermally expanding relative to) the inner wall 202.

FIG. 12 is another cross-sectional view of the example strut fairing 300 of FIG. 3. In illustrated example of FIG. 12, the inflow of fluid (e.g., cooling fluid, air, etc.) moves into the flow passage 216 in a direction as generally indicated by arrows 500. In some examples, a pressurized cavity 502 pushes the fluid into the flow passage 216 corresponding to the direction of the arrows 500. Fluid moves out of the flow passage 216 in a direction as generally indicated by arrows 504.

The arrangement of the example sealing configurations 402 define zones 506, 508, 510, 512, and 514 (e.g., temperature zones) of the strut fairing 300. In some examples, at least one of the zones 506, 508, 510, 512, and 514 may need to be a substantially different temperature (e.g., substantially higher temperature, substantially lower temperature, etc.) based on a design or an application of the strut fairing 300.

Figure 13:
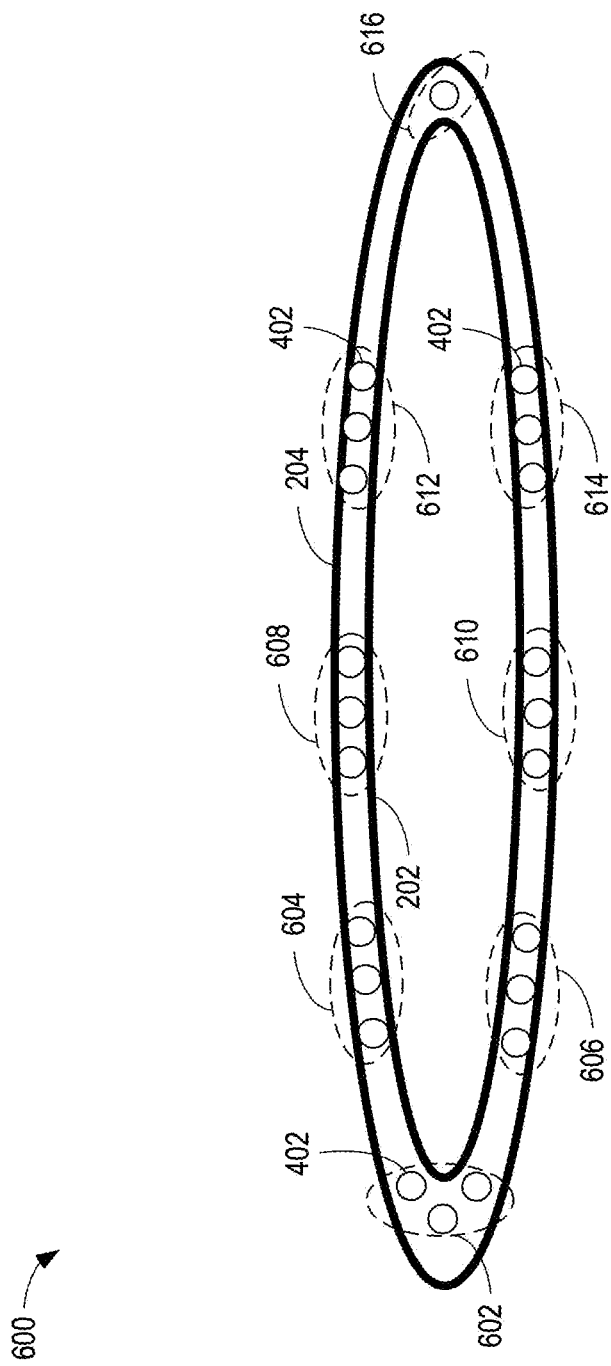
FIG. 13 illustrates an example airfoil that can be implemented in examples disclosed herein.

FIG. 13 is an example engine structure 600 (e.g., an airfoil) that can be implemented in accordance with the teachings of the present disclosure. The example airfoil 600 of FIG. 13 is similar to the strut fairing 300 of FIGS. 10, 11, and 12, but, instead, includes a plurality of sealing configurations 402 distributed in groups 602, 604, 606, 608, 610, 612, 614, and 616 throughout the inner wall 202 and the outer wall 204. In some examples, groups 602, 604, 606, 608, 610, 612, 614, and 616 can provide multiple sealing and damping functions for the example airfoil 600. For example, group 602, with multiple sealing configurations 402, can provide a greater degree of sealing and/or damping relative to group 616, with a singular sealing configuration 402.

Figure 14:
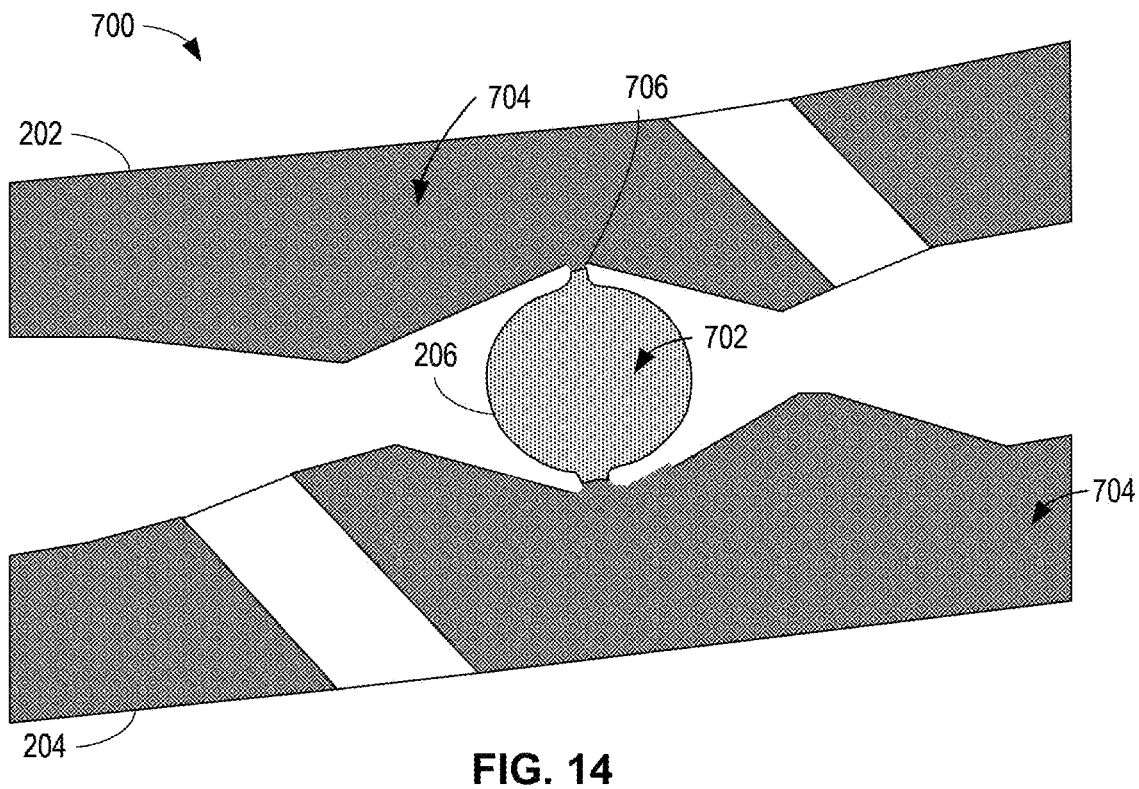
FIGS. 14 and 15 illustrate example sealing configurations that can be implemented in examples disclosed herein.

FIG. 14 is a cross-sectional view of an example sealing configuration 700 that can be implemented in accordance with the teachings of the present disclosure. The example sealing configuration 700 of FIG. 14 is similar to the example sealing configuration 200 of FIG. 2, but, instead, includes a body 206 with a first material 702, and a second material 704. The second material 704 is that of the walls 202 and 204, and the first material 702 is that of the body 206. In operation, the movement of the walls 202 and 204 can result in a stress concentration at point 706 due to a connection between first material 702 and the second material 704.

Figure 15:
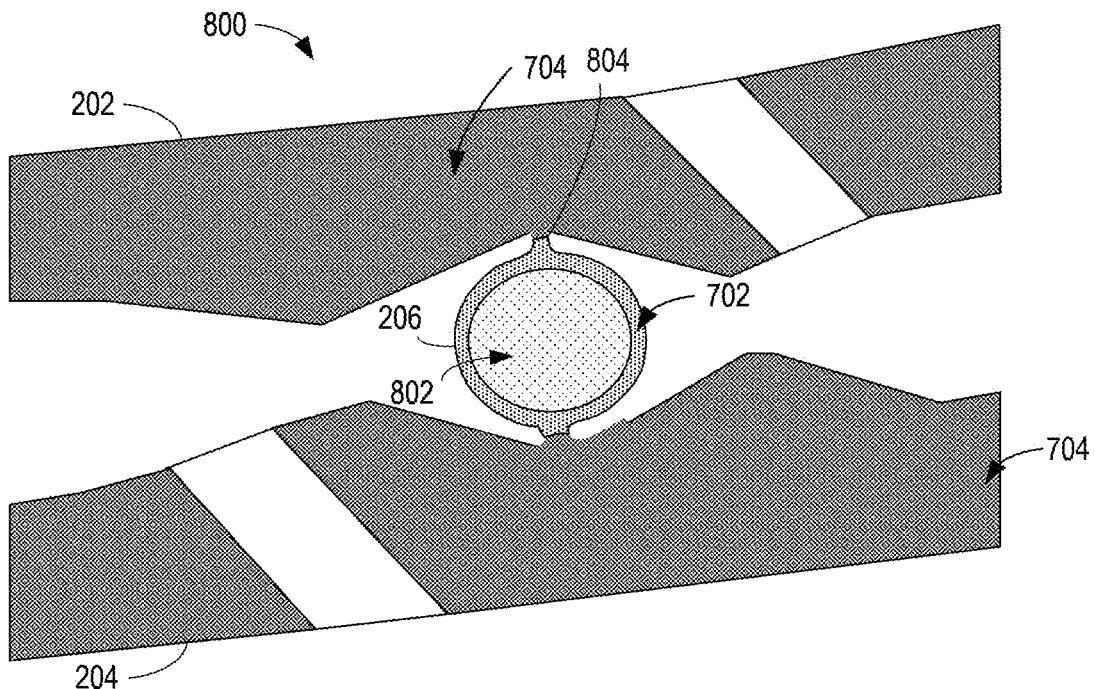

FIG. 15 is a cross-sectional view of an example sealing configuration 800 that can be implemented in accordance with the teachings of the present disclosure. The example sealing configuration 800 of FIG. 15 is similar to the example sealing configuration 700 of FIG. 14, but, instead, includes a body 206 with a third material 802. The third material 802 can be a flexible (e.g., relatively soft, damping, etc.) core of the body 206. In some examples, the first material 702 can be a wear resistant layer of the body 206. In operation, the movement of the walls 202 and 204 can result in a relatively high stress concentration at point 804 due to a connection between first material 702 and the second material 704.

Figure 16:
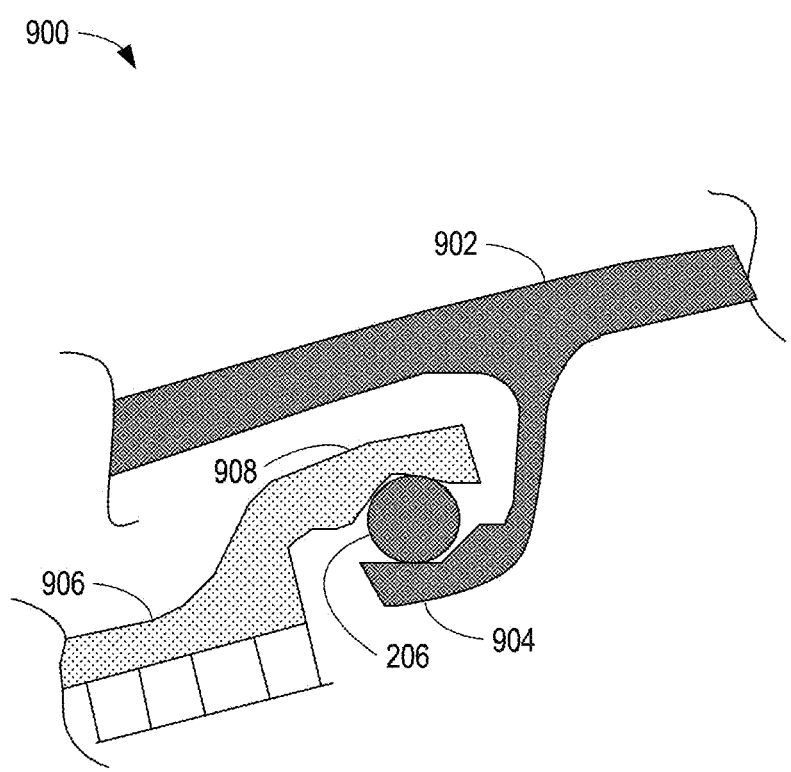
FIG. 16 illustrates an example shroud hanger sealing configuration in an example engine casing assembly that can be implemented in examples disclosed herein.

FIG. 16 is a cross-sectional view of an example shroud hanger sealing configuration 900 that can be implemented in accordance with the teachings of the present disclosure. In some examples, the shroud hanger sealing configuration 900 can be included in an engine casing assembly. The example shroud hanger sealing configuration 900 of FIG. 16 is similar to the example sealing configuration 200 of FIG. 9, but instead includes a first structure 902 having an outer wall 904 and a second structure 906 having an inner wall 908. The body 206 is positioned between the outer wall 904 and the inner wall 908. In some examples, the first structure 902 can be a wall of an engine's hardware (e.g., shroud wall, hanger wall, casing wall, a flow passage wall, etc.) that is different from the second structure 906. Accordingly, the body 206 can be at least one of a sealing mechanism or a damping mechanism for structures 902, 906 (e.g., casing, fairing, shroud, hanger, etc.) within an engine's hardware.

Figure 17:
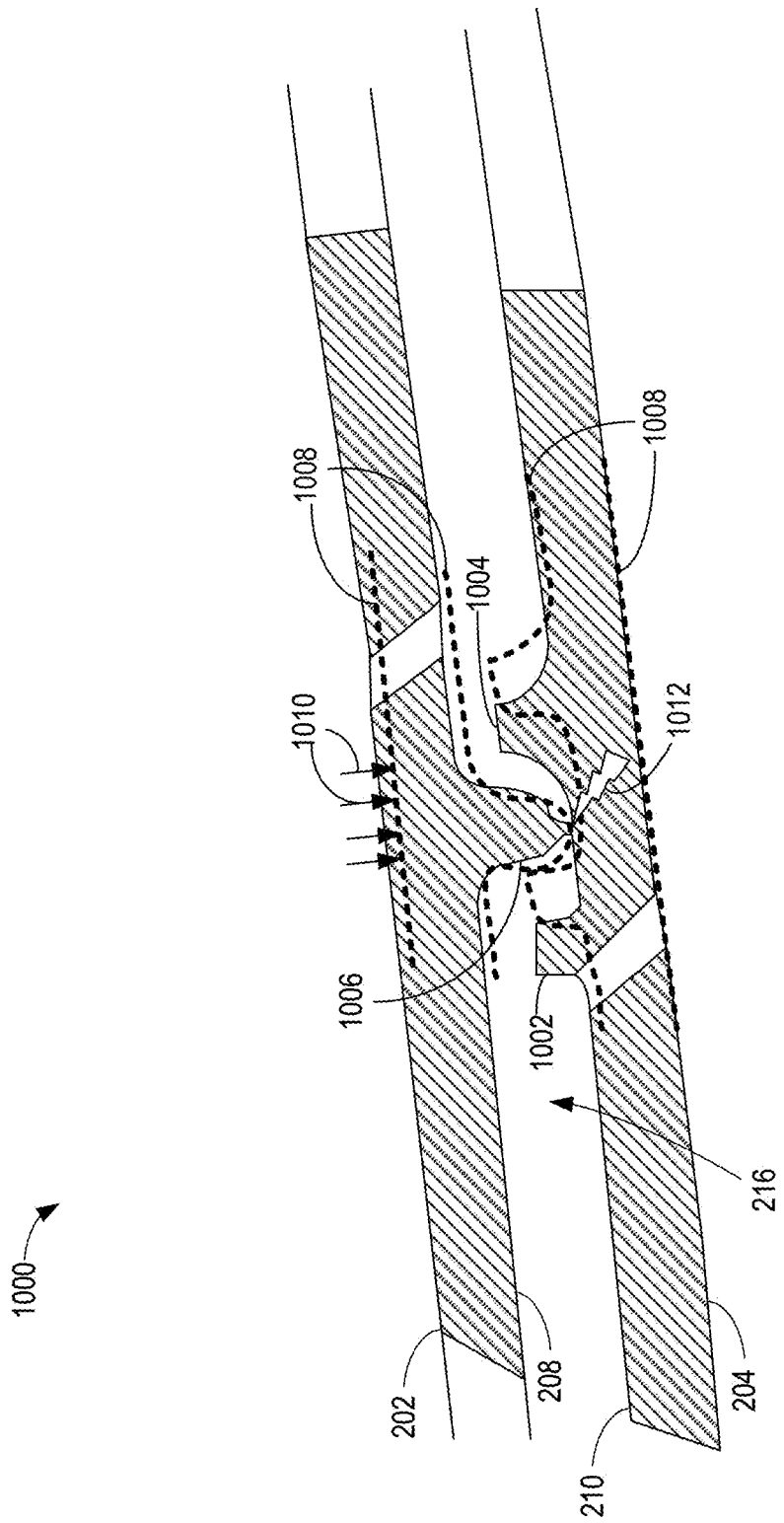
FIG. 17 illustrates another example sealing configuration that can be implemented in examples disclosed herein.

FIG. 17 is a cross-sectional view of an example sealing configuration 1000 that can be implemented in examples disclosed herein. The example sealing configuration 1000 of FIG. 17 is similar to the example sealing configuration 200 of FIG. 9, but, instead, includes ribs 1002 and 1004 disposed on the inner surface 210 of the outer wall 204 and a rib 1006 disposed (e.g., positioned) on the outer surface 208 of the inner wall 202. The rib 1006 is positioned between the ribs 1002 and 1004. In response to the inner wall 202 moving relative to the outer wall 204, the rib 1006 contacts the ribs 1002 and 1004 to at least partially seal (e.g., fully seal, partially close, close, etc.) the flow passage 216, as depicted by outlines 1008.

Additionally or alternatively, the example rib 1006 can dampen (e.g., resist) the movement of the walls 202 and 204. Example forces, exerted in a direction as generally indicated by arrows 1010 on at least one of the walls 202 or 204, can result in a stress concentration point 1012. Accordingly, the example rib 1006 can support (e.g., counter act the force on) the walls 202 and 204 from overpressure due to external forces.

Figure 18:
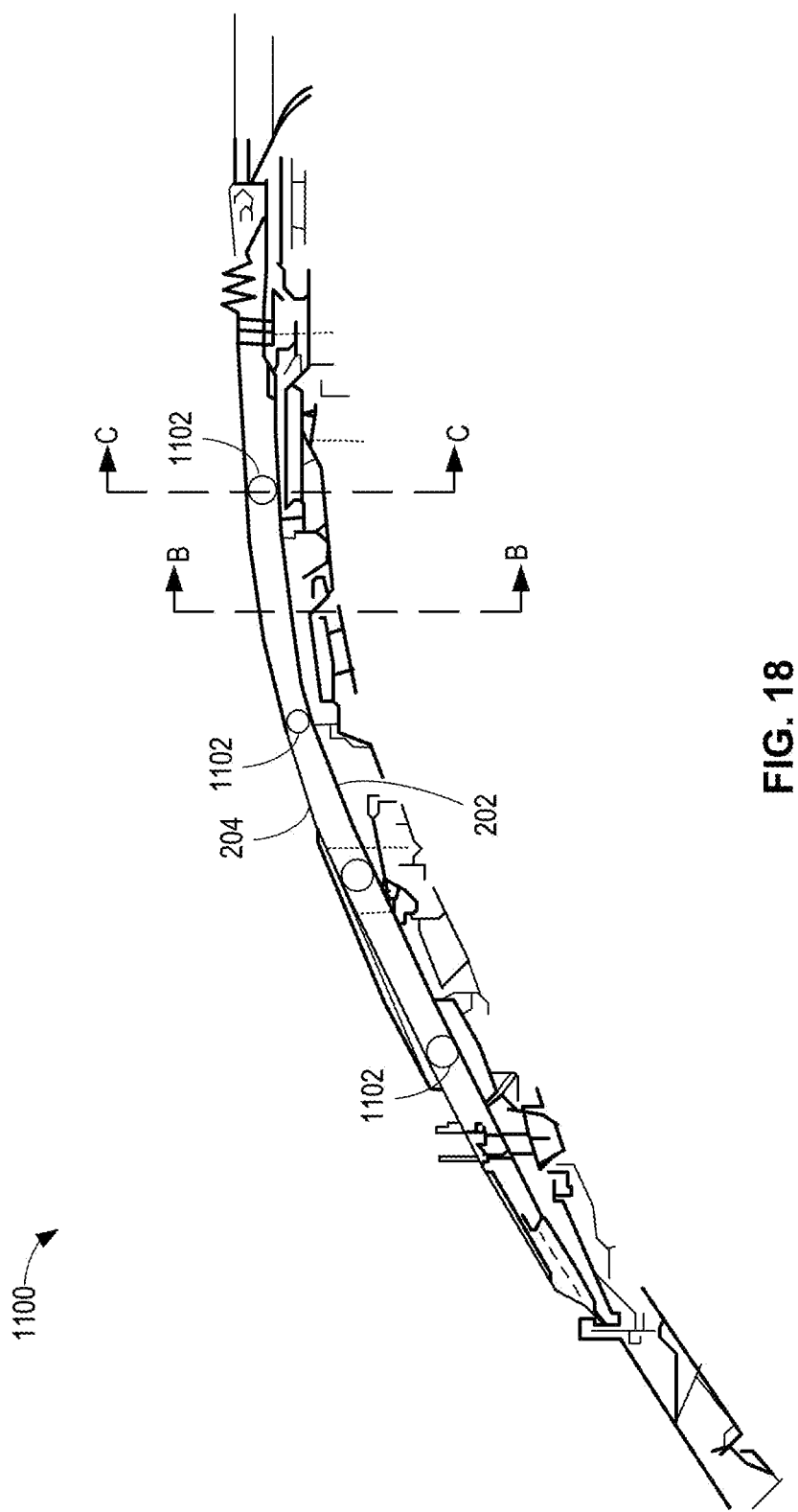
FIG. 18 is a cross-sectional view of an example engine casing that can be implemented in examples disclosed herein.

FIG. 18 is a cross-sectional view of an example casing 1100 (e.g., a double wall casing) that can be implemented in examples disclosed herein. In some examples, the casing 1100 can include the airfoils and/or the sealing configurations described in FIG. 10. In general, the example casing 1100 can have a flow passage positioned between the casing walls or any other double wall structure (e.g., airfoil) described in current disclosure. In particular, the flow between casing walls 202, 204 can be used to cool and/or heat the casing 1100 or to deliver the cooling/heating flow elsewhere. The example casing 1100 has example sealing configurations 1102. The example casing 1100 of FIG. 18 is similar to the example strut fairing 300 of FIGS. 10, 11, and 12, but, instead, the casing 1100 includes multiple sealing configurations 1102 distributed (e.g., dispersed) throughout the inner wall 202 and the outer wall 204 of the casing 1100 (e.g., cooled casing).

Figure 19:
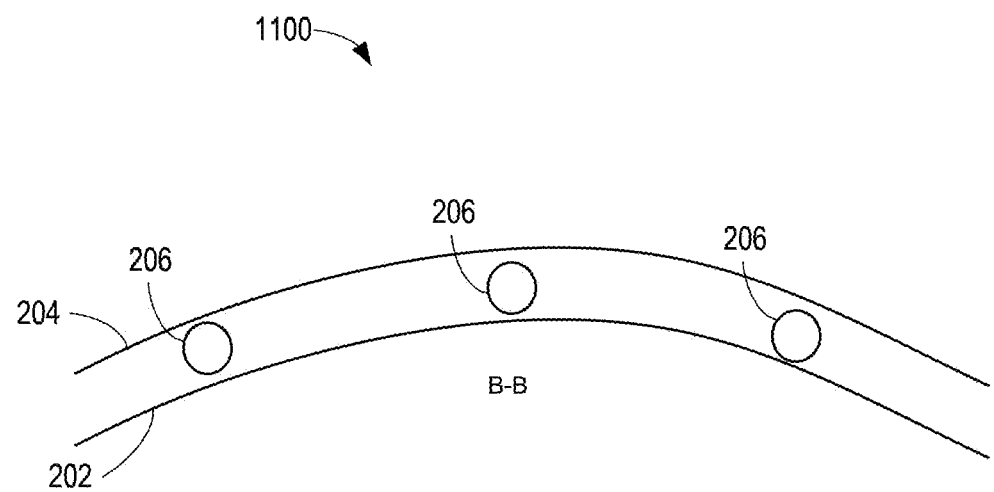
FIGS. 19-21B are top views of the example airfoil section of FIG. 18.

FIG. 19 is a cross-sectional view of the example casing 1100 of FIG. 18 taken along a plane B-B as shown in FIG. 18. In this example, the casing 1100 is depicted with a plurality of bodies 206 traversing the walls 202 and 204 in a first direction that is substantially perpendicular to the walls 202 and 204.

Figure 20:
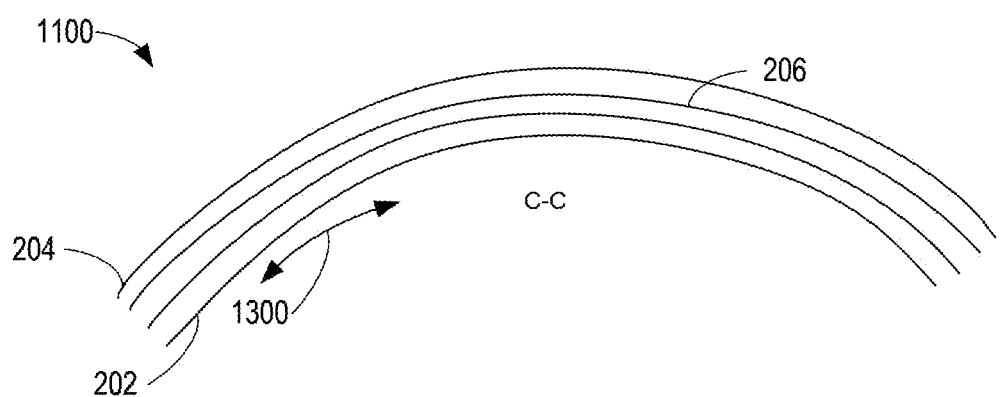

FIG. 20 is a cross-sectional view of the example casing 1100 of FIG. 18 taken along a plane C-C as shown in FIG. 18. In this example, the casing 1100 is depicted with the body 206 extending in a second direction that follows a curve of the walls 202 and 204, as generally indicated by an arrow 1300.

Figure 21A:
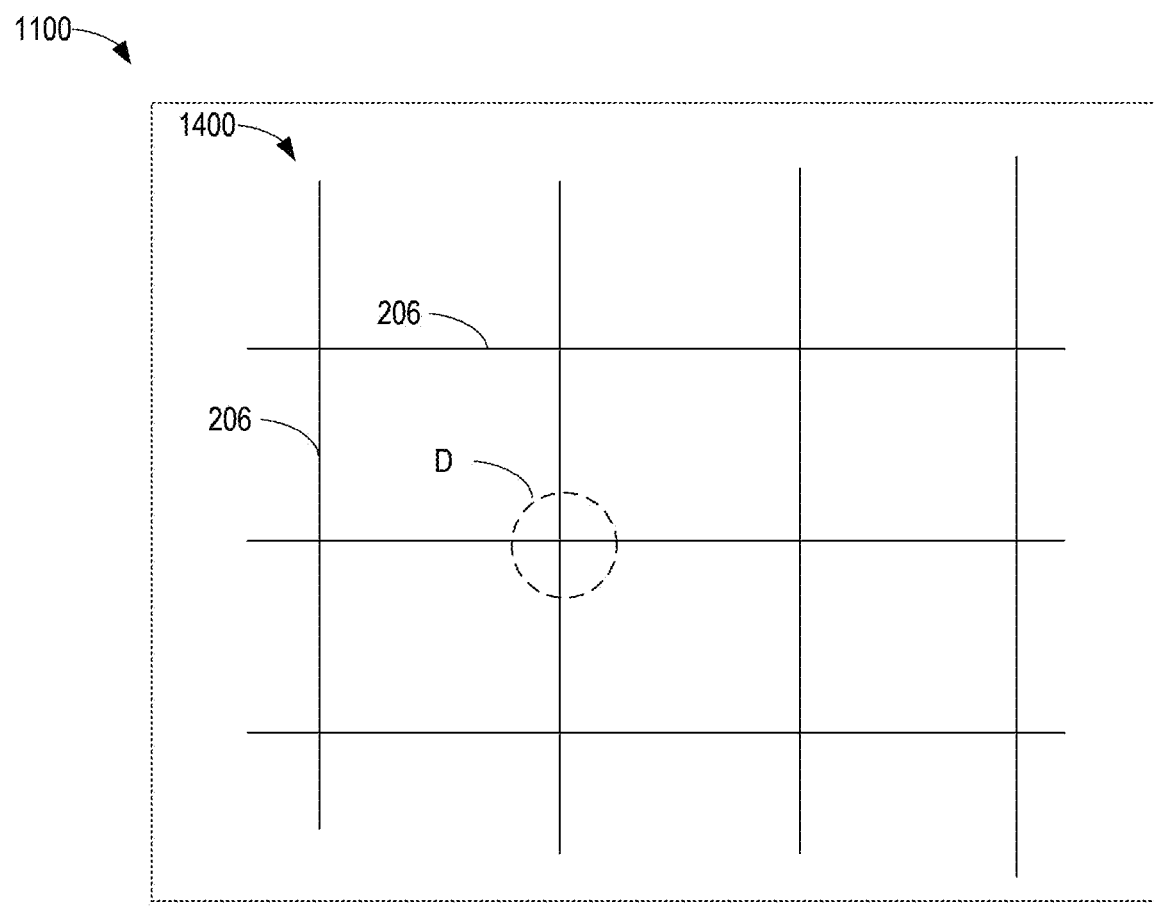
Figure 21B:
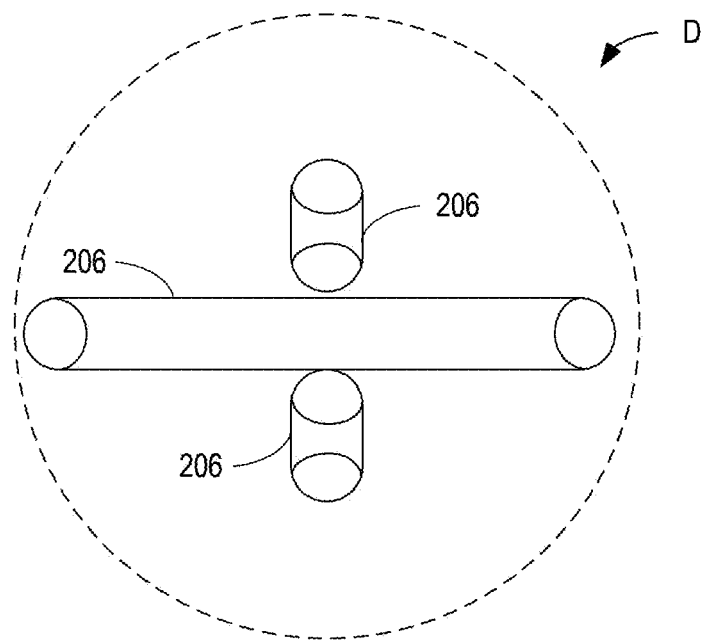

FIGS. 21A-21B are top views of the casing 1100 as shown in FIG. 18. In the example casing 1100 of FIGS. 18-21B, the plurality of bodies 206 are arranged in a pattern (e.g., grid pattern, array, etc.) 1400 as illustrated in FIGS. 21A and 21B. FIG. 21A is a perspective view of the pattern 1400. FIG. 21B is a detailed view of view D of the pattern 1400 as shown in FIG. 21A. The bodies 206 extending in a first direction, as shown in FIG. 19, intersect the bodies 206 extending in a second direction, as shown in FIG. 20.

The examples of FIGS. 11-21B illustrate various engine parts in which partition damper seal configurations can be implemented in accordance with the teachings of the present disclosure. Accordingly, the various engine parts illustrated in FIGS. 11-21B utilize sealing configurations to provide for a sealing function and/or a damping function for segmented internal hardware of an aircraft (e.g., an aircraft engine, aircraft engine casing, etc.). In the example engine parts of FIGS. 11-21B, a sealing configuration, a damper, and structures associated therewith provide sealing of a flow passage in the engine's hardware.

Although each example engine part disclosed above has certain features, it should be understood that it is not necessary for a particular feature of one example airfoil to be used exclusively with that example. Additionally or alternatively, although each example sealing configuration disclosed above has certain features, it should be understood that it is not necessary for a particular feature of one example sealing configuration to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

In some examples, the example strut fairing 300, the example airfoil 600, or casing 1100 includes means for sealing the flow passage, such as the flow passage 216. For example, the means for sealing (e.g., the sealing means) may be implemented by example sealing configurations 200, 402, 700, 800, 900, 1000, 1102. In some examples, the means for sealing may be implemented by bodies 206 and/or the ribs 1002, 1004, 1006.

In some examples, at least one of the inner wall 202 or the inner wall 908 includes first wall means. In some examples, at least one of the outer wall 204 or the outer wall 904 includes second wall means.

From the foregoing, it will be appreciated that example systems, methods, apparatus, and articles of manufacture have been disclosed that provide partition damper seal configurations for segmented internal cooling hardware. In examples disclosed herein, a sealing configuration, a damper, and/or structures associated therewith provide sealing of a flow passage in the engine's hardware and provide a damping function to hold surfaces of a component intact. In examples disclosed herein, cooling of the hardware may enable use of higher temperatures in the engine cycle. In examples disclosed herein, lower grade materials can be utilized in the engine. Further, in examples disclosed herein, the seal can be printed integrally via additive manufacturing, reducing assembly costs and providing sealing in complex geometries. Accordingly, examples disclosed herein enable increased life of an engine, mitigate high vibrations, and reduce high thermal gradients between components of an engine's hardware.

Further aspects are provided by the subject matter of the following clauses:

An aircraft engine assembly comprising: a gas turbine engine having a high pressure compressor, a high pressure turbine, a high pressure shaft coupling the high pressure compressor with the high pressure turbine, a low pressure turbine, and a low pressure shaft coupled to the low pressure turbine, the high pressure turbine located forward of the high pressure compressor, and the low pressure turbine located on a forward end of the gas turbine engine; an intake channel of the gas turbine engine configured to receive an incoming flow of air and form an intake flow of air, the intake channel configured to turn the received incoming flow of air from an incoming flow direction to a first axial direction of the gas turbine engine, the incoming flow direction reverse of the first axial direction; and an electric machine coupled with the low pressure shaft and located at the aft end of the gas turbine engine proximate the intake channel, the electric machine in heat exchange communication with the intake flow of air such that the electric machine transfers heat to the incoming flow of air within the intake channel when the electric machine is operated.

The aircraft engine assembly of one or more of these clauses, which further includes a tail cone, and wherein the electric machine is located within the tail cone.

The aircraft engine assembly of one or more of these clauses, wherein the low pressure shaft is oriented to extend through the intake channel such that an axial portion of the low pressure shaft is surrounded by the incoming flow of air in the intake channel.

The aircraft engine assembly of one or more of these clauses, wherein the electric machine is positioned to receive an impingement of the intake flow of air.

The aircraft engine assembly of one or more of these clauses, wherein an offtake flow of air is extracted from the intake flow of air, the offtake flow of air forming a cooling flow of air routed to the electric machine.

The aircraft engine assembly of one or more of these clauses, wherein the low pressure turbine includes variable stator vanes, wherein the gas turbine engine includes an engine controller, and wherein the variable stator vanes of the low pressure turbine are controlled by the controller to change position when the electric machine changes from a first power level to a second power level.

The aircraft engine assembly of one or more of these clauses, which further includes a propeller located on a forward end of the gas turbine engine and coupled via the low pressure shaft with the low pressure turbine, and which further includes a gearbox coupled between the low pressure shaft and the propeller.

The aircraft engine assembly of one or more of these clauses, which further includes a propeller located on a forward end of the gas turbine engine and coupled via the low pressure shaft with the low pressure turbine, and wherein the propeller is variable pitch propeller, and wherein the electric machine is coaxial with the low pressure shaft.

The aircraft engine assembly of one or more of these clauses, which further includes an engine nacelle enclosing the gas turbine engine, the electric machine located in an enclosed space aft of the high pressure compressor.

The aircraft engine assembly of one or more of these clauses, wherein the engine nacelle includes a discharge opening sized to permit discharge of the portion of the intake flow of air.

The aircraft engine assembly of one or more of these clauses, wherein the electric machine is in a conductive heat exchange communication with the intake flow of air.

The aircraft engine assembly of one or more of these clauses, which further includes an engine nacelle enclosing the gas turbine engine, the electric machine located in an enclosed space aft of the high pressure compressor.

The aircraft engine assembly of one or more of these clauses, wherein the engine nacelle includes a discharge opening sized to permit discharge of the portion of the intake flow of air.

The aircraft engine assembly of one or more of these clauses, wherein the electric machine is in a conductive heat exchange communication with the intake flow of air.

The aircraft engine assembly of one or more of these clauses, wherein the intake channel includes a first portion that directs air into a first radial side of the low pressure shaft, wherein the intake channel includes a second portion configured as annular in shape, and wherein the first portion is upstream of the second portion, the second portion directing the intake flow of air in the first axial flow direction toward the high pressure compressor.

An aircraft powerplant comprising: a gas turbine engine having a high pressure compressor and a high pressure turbine, the gas turbine engine further having a high pressure shaft coupling the high pressure compressor with the high pressure turbine, the gas turbine engine also having a first axial flow direction from the high pressure compressor to the high pressure turbine; a propeller coupled to a low pressure turbine of the gas turbine engine using a low pressure shaft, the low pressure shaft located coaxial with the high pressure shaft, the propeller configured to receive a free stream flow of air oriented in a freestream direction and impart work upon the free stream flow of air, the propeller located on an upstream side of the freestream direction from the high pressure turbine; an intake channel defining an intake flow of air in fluid communication with the gas turbine engine, the intake channel configured to reverse the intake flow of air initially flowing in the freestream direction to the first axial flow direction of the gas turbine engine; and an electric machine coupled to the low pressure shaft and located on an opposite side of the gas turbine engine from the propeller, the electric machine positioned to be cooled by a portion of the intake flow of air defined by the intake channel.

The aircraft powerplant of one or more of these clauses, which further includes an engine nacelle enclosing the gas turbine engine, the electric machine located in an enclosed space aft of the high pressure compressor.

The aircraft powerplant of one or more of these clauses, wherein the engine nacelle includes a discharge opening sized to permit discharge of the portion of the intake flow of air.

The aircraft powerplant of one or more of these clauses, wherein the electric machine is in a conductive heat exchange communication with the intake flow of air.

The aircraft powerplant of one or more of these clauses, wherein the intake channel includes a first portion that directs air into a first radial side of the low pressure shaft, wherein the intake channel includes a second portion configured as annular in shape, and wherein the first portion is upstream of the second portion, the second portion directing air in the first axial flow direction toward the high pressure compressor.

The aircraft powerplant of one or more of these clauses, wherein the gas turbine engine includes an engine controller, and wherein the engine controller commands a change in fuel flow rate to a combustion section of the gas turbine engine when the electric machine changes from a first power level to a second power level.

The aircraft powerplant of one or more of these clauses, wherein the low pressure turbine is a free turbine.

The aircraft powerplant of one or more of these clauses, an engine exhaust configured to receive an exhaust flow in the first axial flow direction from the low pressure turbine and discharge the exhaust flow having a second axial direction component reverse of the first axial direction.

A method of cooling an electric machine comprising: operating a gas turbine engine having a high pressure compressor, a high pressure turbine, and a high pressure shaft, the high pressure compressor coupled to the high pressure turbine via the high pressure shaft, the gas turbine engine also including a low pressure turbine coupled via a low pressure shaft with a propeller; receiving an incoming flow of air in an incoming flow of air direction into an intake channel of the gas turbine engine, the incoming flow of air used in a combustion process of the gas turbine engine, the intake channel forming an intake channel flow path and defining an intake flow air; turning the intake flow of air using the intake channel from the incoming flow of air direction to an axial flow direction of the gas turbine engine; and cooling an electric machine located aft of the low pressure turbine using the intake flow of air flowing through the intake channel flow path.

The method of cooling an electric machine of one or more of these clauses, wherein the cooling includes impingement cooling the electric machine using the intake flow of air.

The method of cooling an electric machine of one or more of these clauses, wherein turning the flow includes changing shape of the flow from a non-annular shape to an annular shape.

The method of cooling an electric machine of one or more of these clauses, wherein the electric machine is located in a tail cone located aft of the gas turbine engine.

An aircraft engine assembly including: a gas turbine engine having a high pressure compressor, a high pressure turbine, a high pressure shaft coupling the high pressure compressor with the high pressure turbine, a low pressure turbine, and a low pressure shaft coupled to the low pressure turbine, the high pressure turbine located forward of the high pressure compressor, and the low pressure turbine located on a forward end of the gas turbine engine; a propeller located on a forward end of the gas turbine engine and coupled via the low pressure shaft with the low pressure turbine; an intake channel of the gas turbine engine configured to receive an incoming flow of air and form an intake flow of air, the intake channel configured to turn the received incoming flow of air from an incoming flow direction to a first axial direction of the gas turbine engine, the incoming flow direction reverse of the first axial direction; and an electric machine coupled with the low pressure shaft and located on a side of the high pressure compressor opposite of the high pressure turbine and proximate the intake channel, the electric machine in heat exchange communication with the intake flow of air such that the electric machine transfers heat to the incoming flow of air within the intake channel when the electric machine is operated, wherein at least one of the gas turbine engine, the propeller, the intake channel, or the electric machine includes an engine structure including: an outer wall having a first rib spaced apart from a second rib on a surface of the outer wall; and an inner wall surrounded by the outer wall, the inner wall having a third rib protruding from the inner wall towards the surface of the outer wall, an end of the third rib detachably coupled to a portion of the surface of the outer wall, the portion of the surface positioned between the first rib and the second rib, the third rib and at least one of the first rib or the second rib to at least partially seal a flow passage between the inner and outer walls.

The aircraft engine assembly of any preceding clause, wherein the engine structure includes at least one of a fairing, a strut, a casing, a passage, or an airfoil.

The aircraft engine assembly of any preceding clause, wherein the third rib separates the inner wall from the outer wall.

The aircraft engine assembly of any preceding clause, wherein ends of the first and second ribs are spaced apart from the inner wall.

The aircraft engine assembly of any preceding clause, wherein a side of the third rib contacts a side of the first rib to at least partially seal the flow passage, the side of the third rib facing the side of the first rib.

The aircraft engine assembly of any preceding clause, wherein the first, second, and third ribs traverse the inner and outer walls in an axial direction.

The aircraft engine assembly of any preceding clause, wherein the surface is a first surface, further including a second surface of the outer wall opposing the first surface, the outer wall including an aperture extending through the first and second surfaces.

The aircraft engine assembly of any preceding clause, wherein the aperture is a first aperture, wherein the inner wall includes third and fourth opposing surfaces, the inner wall including a second aperture extending through the third and fourth surfaces, the first, second, and third ribs positioned between the first and second apertures.

The aircraft engine assembly of any preceding clause, wherein the first aperture is adjacent to the first rib.

The aircraft engine assembly of any preceding clause, which further includes a tail cone, and wherein the electric machine is located within the tail cone.

The aircraft engine assembly of any preceding clause, wherein the low pressure shaft is oriented to extend through the intake channel such that an axial portion of the low pressure shaft is surrounded by the incoming flow of air in the intake channel.

The aircraft engine assembly of any preceding clause, wherein the electric machine is positioned to receive an impingement of the intake flow of air.

The aircraft engine assembly of any preceding clause, wherein an offtake flow of air is extracted from the intake flow of air, the offtake flow of air forming a cooling flow of air routed to the electric machine.

The aircraft engine assembly of any preceding clause, wherein the low pressure turbine includes variable stator vanes, wherein the gas turbine engine includes an engine controller, and wherein the variable stator vanes of the low pressure turbine are controlled by the engine controller to change position when the electric machine changes from a first power level to a second power level.

The aircraft engine assembly of any preceding clause, which further includes a propeller located on a forward end of the gas turbine engine and coupled via the low pressure shaft with the low pressure turbine, and which further includes a gearbox coupled between the low pressure shaft and the propeller.

The aircraft engine assembly of any preceding clause, which further includes a propeller located on a forward end of the gas turbine engine and coupled via the low pressure shaft with the low pressure turbine, and wherein the propeller is a variable pitch propeller, and wherein the electric machine is coaxial with the low pressure shaft.

An aircraft powerplant including: a gas turbine engine having a high pressure compressor and a high pressure turbine, the gas turbine engine further having a high pressure shaft coupling the high pressure compressor with the high pressure turbine, the gas turbine engine also having a first axial flow direction from the high pressure compressor to the high pressure turbine; a propeller coupled to a low pressure turbine of the gas turbine engine using a low pressure shaft, the low pressure shaft located coaxial with the high pressure shaft, the propeller configured to receive a free stream flow of air oriented in a freestream direction and impart work upon the free stream flow of air, the propeller located on an upstream side of the freestream direction from the high pressure turbine; an intake channel defining an intake flow of air in fluid communication with the gas turbine engine, the intake channel configured to reverse the intake flow of air initially flowing in the freestream direction to the first axial flow direction of the gas turbine engine; an electric machine coupled to the low pressure shaft and located on an opposite side of the gas turbine engine from the propeller, the electric machine positioned to be cooled by a portion of the intake flow of air defined by the intake channel, wherein at least one of the gas turbine engine, the propeller, the intake channel, or the electric machine includes an engine structure including: an outer wall having a first rib spaced apart from a second rib on a surface of the outer wall; and an inner wall surrounded by the outer wall, the inner wall having a third rib protruding from the inner wall towards the surface of the outer wall, an end of the third rib detachably coupled to a portion of the surface of the outer wall, the portion of the surface positioned between the first rib and the second rib, the third rib and at least one of the first rib or the second rib to at least partially seal a flow passage between the inner and outer walls.

The aircraft powerplant of any preceding clause, wherein the engine structure includes at least one of a fairing, a strut, a casing, a passage, or an airfoil.

The aircraft powerplant of any preceding clause, wherein the low pressure shaft is oriented to extend through the intake channel such that an axial portion of the low pressure shaft is surrounded by the incoming flow of air in the intake channel.

The aircraft powerplant of any preceding clause, wherein the low pressure turbine includes variable stator vanes, wherein the gas turbine engine includes an engine controller, and wherein the variable stator vanes of the low pressure turbine are controlled by the engine controller to change position when the electric machine changes from a first power level to a second power level.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

We claim:

1. An aircraft engine assembly comprising:
   a gas turbine engine having a high pressure compressor, a high pressure turbine, a high pressure shaft coupling the high pressure compressor with the high pressure turbine, a low pressure turbine, and a low pressure shaft coupled to the low pressure turbine, the high pressure turbine located forward of the high pressure compressor, and the low pressure turbine located on a forward end of the gas turbine engine;
   a propeller located on the forward end of the gas turbine engine and coupled via the low pressure shaft with the low pressure turbine;
   an intake channel of the gas turbine engine configured to receive an incoming flow of air and form an intake flow of air, the intake channel configured to turn the received incoming flow of air from an incoming flow direction to a first axial direction of the gas turbine engine, the incoming flow direction reverse of the first axial direction; and
   an electric machine coupled with the low pressure shaft and located on a side of the high pressure compressor opposite of the high pressure turbine and proximate the intake channel, the electric machine in heat exchange communication with the intake flow of air such that the electric machine transfers heat to the incoming flow of air within the intake channel when the electric machine is operated,
   wherein at least one of the gas turbine engine, the propeller, the intake channel, or the electric machine includes a structure including:
      an inner wall and an outer wall, the outer wall spaced apart from the inner wall to define a flow passage between the outer wall and the inner wall; and
      a body positioned between the outer wall and the inner wall, the body detachably coupled to a surface of at least one of the outer wall or the inner wall to at least partially seal the flow passage.

2. The aircraft engine assembly of claim 1, wherein the structure includes at least one of a fairing, a strut, a casing, a hanger, a shroud, or an airfoil.

3. The aircraft engine assembly of claim 1, wherein the body is a damper between the inner wall and the outer wall.

4. The aircraft engine assembly of claim 1, wherein the outer wall is movable with respect to the inner wall based on thermal expansion.

5. The aircraft engine assembly of claim 1, wherein the body is an additively manufactured seal.

6. The aircraft engine assembly of claim 5, wherein the additively manufactured seal is a wire.

7. The aircraft engine assembly of claim 1, wherein the body is detachably coupled to the surface of at least one of the outer wall or the inner wall with a ligament.

8. The aircraft engine assembly of claim 7, further including at least one aperture extending through at least one of the inner wall or the outer wall to the flow passage.

9. The aircraft engine assembly of claim 1, further including a plurality of bodies distributed between the inner wall and the outer wall.

10. The aircraft engine assembly of claim 1, which further includes a tail cone, and wherein the electric machine is located within the tail cone.

11. The aircraft engine assembly of claim 1, wherein the low pressure shaft is oriented to extend through the intake channel such that an axial portion of the low pressure shaft is surrounded by the incoming flow of air in the intake channel.

12. The aircraft engine assembly of claim 1, wherein the electric machine is positioned to receive an impingement of the intake flow of air.

13. The aircraft engine assembly of claim 1, wherein an offtake flow of air is extracted from the intake flow of air, the offtake flow of air forming a cooling flow of air routed to the electric machine.

14. The aircraft engine assembly of claim 1, wherein the low pressure turbine includes variable stator vanes, wherein the gas turbine engine includes an engine controller, and wherein the variable stator vanes of the low pressure turbine are controlled by the engine controller to change position when the electric machine changes from a first power level to a second power level.

15. The aircraft engine assembly of claim 1, further including a gearbox coupled between the low pressure shaft and the propeller.

16. The aircraft engine assembly of claim 1, wherein the propeller is a variable pitch propeller, and wherein the electric machine is coaxial with the low pressure shaft.

17. An aircraft powerplant comprising:
   a gas turbine engine having a high pressure compressor and a high pressure turbine, the gas turbine engine further having a high pressure shaft coupling the high pressure compressor with the high pressure turbine, the gas turbine engine also having a first axial flow direction from the high pressure compressor to the high pressure turbine;
   a propeller coupled to a low pressure turbine of the gas turbine engine using a low pressure shaft, the low pressure shaft located coaxial with the high pressure shaft, the propeller configured to receive a free stream flow of air oriented in a freestream direction and impart work upon the free stream flow of air, the propeller located on an upstream side of the freestream direction from the high pressure turbine;
   an intake channel defining an intake flow of air in fluid communication with the gas turbine engine, the intake channel configured to reverse the intake flow of air initially flowing in the freestream direction to the first axial flow direction of the gas turbine engine;
   an electric machine coupled to the low pressure shaft and located on an opposite side of the gas turbine engine from the propeller, the electric machine positioned to be cooled by a portion of the intake flow of air defined by the intake channel,
   wherein at least one of the gas turbine engine, the propeller, the intake channel, or the electric machine includes a structure including:
      an inner wall and an outer wall, the outer wall spaced apart from the inner wall to define a flow passage between the outer wall and the inner wall; and
      a body positioned between the outer wall and the inner wall, the body detachably coupled to a surface of at least one of the outer wall or the inner wall to at least partially seal the flow passage.

18. The aircraft powerplant of claim 17, wherein the structure includes at least one of a fairing, a strut, a casing, a hanger, a shroud, or an airfoil.

19. The aircraft powerplant of claim 17, wherein the body is an additively manufactured wire.

20. The aircraft powerplant of claim 17, wherein the body is detachably coupled to the surface of the at least one of the outer wall or the inner wall with a ligament.

* * * * *